US012424360B2

(12) United States Patent
Kataoka et al.

(10) Patent No.: US 12,424,360 B2
(45) Date of Patent: Sep. 23, 2025

(54) GRAIN-ORIENTED ELECTRICAL STEEL SHEET AND METHOD FOR MANUFACTURING SAME

(71) Applicant: NIPPON STEEL CORPORATION, Tokyo (JP)

(72) Inventors: Takashi Kataoka, Tokyo (JP); Tomohito Tanaka, Tokyo (JP); Masataka Iwaki, Tokyo (JP); Kazutoshi Takeda, Tokyo (JP); Hideyuki Hamamura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 69 days.

(21) Appl. No.: 18/283,423

(22) PCT Filed: Mar. 28, 2022

(86) PCT No.: PCT/JP2022/015222

§ 371 (c)(1),
(2) Date: Sep. 21, 2023

(87) PCT Pub. No.: WO2022/203089

PCT Pub. Date: Sep. 29, 2022

(65) Prior Publication Data

US 2024/0177899 A1 May 30, 2024

(30) Foreign Application Priority Data

Mar. 26, 2021 (JP) ................................ 2021-053618

(51) Int. Cl.
*H01F 1/147* (2006.01)
*C21D 6/00* (2006.01)
(Continued)

(52) U.S. Cl.
CPC ......... *H01F 1/14783* (2013.01); *C21D 6/002* (2013.01); *C21D 6/005* (2013.01);
(Continued)

(58) Field of Classification Search
None
See application file for complete search history.

(56) References Cited

U.S. PATENT DOCUMENTS 6,368,424 B1 4/2002 Sakai et al.
2006/0169362 A1 8/2006 Sakai et al.
(Continued)

FOREIGN PATENT DOCUMENTS

JP 3361709 B2 1/2003
JP 4510757 B2 7/2010
(Continued)

*Primary Examiner* — Daniel J. Schleis
(74) *Attorney, Agent, or Firm* — Birch, Stewart Kolasch & Birch, LLP

(57) ABSTRACT

This grain-oriented electrical steel sheet includes a base steel sheet having a predetermined chemical composition, a glass coating formed on the base steel sheet, and a tension-applied insulation coating formed on the glass coating, on a front surface of the base steel sheet, a plurality of linear strains that extend continuously or intermittently in a direction intersecting with a rolling direction are present, intervals p in the rolling direction of the plurality of linear strains adjacent to each other are 3.0 to 9.0 mm, widths of the linear strains are 10 to 250 μm, and, in an X-ray topographic spectrum in a range of 1.50 mm in the rolling direction that is obtained from an X-ray topographic image of the front surface and includes the linear strain at a center, a full width at half maximum of a peak of the X-ray topographic spectrum including a maximum value of a spectral intensity is 0.02 mm or more and 0.10 mm or less.

8 Claims, 2 Drawing Sheets

(51) Int. Cl.

| | |
|---|---|
| ***C21D 8/12*** | (2006.01) |
| ***C21D 9/46*** | (2006.01) |
| ***C21D 10/00*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/12*** | (2006.01) |
| ***C22C 38/16*** | (2006.01) |
| ***C22C 38/34*** | (2006.01) |
| ***C22C 38/60*** | (2006.01) |
| ***C23D 3/00*** | (2006.01) |
| ***C23D 5/04*** | (2006.01) |
| ***C23D 13/00*** | (2006.01) |

(52) U.S. Cl.

CPC ........... *C21D 6/008* (2013.01); *C21D 8/1222* (2013.01); *C21D 8/1233* (2013.01); *C21D 8/1255* (2013.01); *C21D 8/1261* (2013.01); *C21D 8/1266* (2013.01); *C21D 8/1283* (2013.01); *C21D 8/1288* (2013.01); *C21D 9/46* (2013.01); *C21D 10/005* (2013.01); *C22C 38/001* (2013.01); *C22C 38/002* (2013.01); *C22C 38/004* (2013.01); *C22C 38/008* (2013.01); *C22C 38/02* (2013.01); *C22C 38/04* (2013.01); *C22C 38/06* (2013.01); *C22C 38/12* (2013.01); *C22C 38/16* (2013.01); *C22C 38/34* (2013.01); *C22C 38/60* (2013.01); *C23D 3/00* (2013.01); *C23D 5/04* (2013.01); *C23D 13/00* (2013.01); *C21D 2201/05* (2013.01); *C22C 2202/02* (2013.01)

(56) References Cited

U.S. PATENT DOCUMENTS

| | | | | |
|---|---|---|---|---|
| 2010/0243629 | A1 | 9/2010 | Sakai et al. | |
| 2014/0360629 | A1 | 12/2014 | Inoue et al. | |
| 2015/0187474 | A1 | 7/2015 | Takajo et al. | |
| 2015/0310973 | A1 | 10/2015 | Takajo et al. | |
| 2017/0253940 | A1 | 9/2017 | Takajo et al. | |
| 2017/0298467 | A1* | 10/2017 | Suehiro | C22C 38/16 |
| 2018/0037965 | A1 | 2/2018 | Takajo et al. | |
| 2021/0043345 | A1* | 2/2021 | Kataoka | C22C 38/02 |
| 2021/0355557 | A1* | 11/2021 | Nakamura | C21D 9/46 |

FOREIGN PATENT DOCUMENTS

| | | | | |
|---|---|---|---|---|
| JP | 4669565 | B2 | 4/2011 | |
| JP | 5954421 | B2 | 7/2016 | |
| JP | 6060988 | B2 | 1/2017 | |
| JP | 6169695 | B2 | 7/2017 | |
| JP | 6176282 | B2 | 8/2017 | |
| JP | 6245296 | B2 | 12/2017 | |
| WO | WO-2012172624 | A1 * | 12/2012 | C21D 8/1222 |
| WO | WO 2013/099272 | A1 | 7/2013 | |
| WO | WO 2014/068962 | A1 | 5/2014 | |

* cited by examiner

GRAIN-ORIENTED ELECTRICAL STEEL SHEET AND METHOD FOR MANUFACTURING SAME

TECHNICAL FIELD OF THE INVENTION

The present invention relates to a grain-oriented electrical steel sheet and a method for manufacturing the same.

Priority is claimed on Japanese Patent Application No. 2021-053618, filed Mar. 26, 2021, the content of which is incorporated herein by reference.

RELATED ART

Grain-oriented electrical steel sheets are soft magnetic materials and are mainly used as core materials of transformers. Therefore, grain-oriented electrical steel sheets are required to have magnetic characteristics such as high magnetization characteristics and a low iron loss.

The iron loss is a power loss that is consumed as heat energy in the case of exciting a core with an AC magnetic field, and the iron loss is required to be as low as possible from the viewpoint of energy saving. The degree of iron loss is affected by magnetization ratio, sheet thickness, coating tension, the amount of impurities, electric resistivity, grain sizes, magnetic domain sizes, and the like. Although a variety of techniques have been thus far developed regarding grain-oriented electrical steel sheets, research and development for reducing iron loss is still underway in order to increase energy efficiency.

For example, Patent Document 1 discloses a method for manufacturing a grain-oriented electrical steel sheet having a step of irradiating a surface of a grain-oriented electrical steel sheet with a focused continuous-wave laser beam while scanning the grain-oriented electrical steel sheet in a direction inclined with respect to a rolling direction and a step of repeating irradiation while shifting portions to be scanned with the continuous-wave laser beams at predetermined intervals, in which, when an average power of the continuous-wave laser beams is represented by P (W), a velocity of the scanning is represented by Vc (mm/s), the predetermined intervals are represented by PL (mm), and an average irradiation energy density Ua is defined as $Ua=P/(Vc\times PL)$ ($mJ/mm^2$), magnetic domains are controlled by irradiation with the laser beams in a manner that $1.0\ mm\leq PL\leq 3.0\ mm$ and $0.8\ mJ/mm^2\leq Ua\leq 2.0\ mJ/mm^2$ are satisfied.

Patent Document 1 shows that iron losses can be easily reduced in both directions of an L direction and a C direction of the grain-oriented electrical steel sheet while ensuring high productivity.

In addition, Patent Document 2 discloses a method for manufacturing a grain-oriented electrical steel sheet in which linear closure domains are formed approximately perpendicular to a rolling direction of the steel sheet at approximately constant intervals by scanning and irradiation with continuously oscillating laser beams to improve iron loss characteristics.

Patent Document 2 shows that, when a laser is in a $TEM_{00}$ mode in which the laser beam intensity profile in a cross section perpendicular to a beam propagation direction has the maximum intensity near the center of the optical axis, and the focused diameter d [mm] in the rolling direction of the irradiation beam, the scanning linear velocity V [mm/s] of the laser beam, and the average output P [W] of the laser are in ranges of $0<d\leq 0.2$ and $0.001\leq P/V\leq 0.012$, a grain-oriented electrical steel sheet having a reduced iron loss can be obtained.

In addition, Patent Document 3 discloses a method for manufacturing a grain-oriented electrical steel sheet, in which a surface of a grain-oriented electrical steel sheet is irradiated with a laser beam at equal intervals to improve magnetic characteristics.

In Patent Document 3, the laser is a pulse-oscillating Q-switch $CO_2$ laser, and the irradiation beam shape is an ellipse having a long axis in the sheet width direction. In addition, it is shown that the generation of a laser irradiation mark is suppressed by setting the irradiation power density of the laser pulse to be equal to or less than the membrane damage threshold on the surface of the steel sheet, continuous pulse beams are superimposed on the surface of the steel sheet and a cumulative irradiation energy large enough for magnetic characteristics improvement is imparted by setting the long axis length of the elliptical beam to be equal to or more than the pulse beam irradiation interval in the sheet width direction by suppressing laser irradiation marks, and an efficient magnetic domain control effect can be obtained.

Incidentally, in recent years, there has been an increasing demand for reduction of noise and vibration in electromagnetic application equipment such as transformers, and grain-oriented electrical steel sheets that are used for cores of transformers are required to be a material suitable for not only a low iron loss but also low noise or low vibration. It is said that one of the causes in materials for the noise or vibration of transformers is the magnetostriction of grain-oriented electrical steel sheets. The magnetostriction mentioned herein refers to vibration that is shown in the rolling direction of a grain-oriented electrical steel sheet caused by a slight change in the outer shape of the grain-oriented electrical steel sheet in association with a change in the intensity of magnetization when the grain-oriented electrical steel sheet has been excited by alternating currents. The magnitude of this magnetostriction is as extremely small as an order of $10^{-6}$, but this magnetostriction generates vibration in cores, the vibration propagates into an external structure such as a tank of a transformer and turns into noise.

Laser irradiation to a grain-oriented electrical steel sheet as proposed in Patent Documents 1 to 3 described above is effective for reducing iron losses, but there is a problem in that a closure domain that is formed in association with strains that are applied by laser irradiation increases magnetostriction, whereby noise characteristics deteriorate.

With respect to such a problem, for example. Patent Document 4 discloses a grain-oriented electrical steel sheet having a low iron loss and in which a noise is small noise when incorporated into a transformer.

Patent Document 4 shows that, when closure domain regions having a width in the rolling direction on the surface of the steel sheet changing periodically are formed, each of the closure domain regions satisfies conditions that the ratio (Wmax/Wmin) of the maximum width Wmax to the minimum width Wmin in the rolling direction on the surface of the steel sheet is 1.2 or more and 2.2 or less, the average width Wave in the rolling direction on the surface of the steel sheet is 80 μm or more and 250 μm or less, the maximum depth D in the sheet thickness direction is 32 μm or more, and (Wave×D)/s is 0.0007 mm or more and 0.0016 mm or less, it is possible to realize a more favorable iron loss/noise balance than in the related art.

In addition, Patent Document 5 describes a grain-oriented electrical steel sheet in which local strains are introduced in a direction crossing a rolling direction at periodic intervals in the rolling direction, in which linear closure domain portions are formed near the strains, in a demagnetization state, magnetic domains having a rolling-direction length of 1.2 mm or more elongated in the rolling direction from the closure domain portion are present, and, furthermore, in regions along the closure domain portions, 1.8 or more magnetic domains per millimeter are formed on average, and in a case where linear intervals of the closure domain portions are represented by s (mm), a width of the closure domain portion: w (mm) and a depth of the closure domain portion in a sheet thickness direction: h (μm) satisfy a relationships of 4 mm≤s≤1.5 mm and hw/s≤0.9 μm.

Patent Document 5 suggests that the strain introduction amount index represented by hw/s affects iron losses and noise.

However, as a result of the present inventors' studies, it was found that, in the techniques of Patent Documents 4 and 5. improvement in noise characteristics is not sufficient with respect to a superior iron loss/noise balance that has been required in recent years.

In addition, additionally, as a technique for controlling a closure domain, for example, Patent Documents 6 and 7 disclose methods for manufacturing a grain-oriented electrical steel sheet in which a closure domain is formed without damaging a coating and a grain-oriented electrical steel sheet having an extremely low transformer iron loss and BF is provided.

In addition, Patent Document 8 shows that a grain-oriented electrical steel sheet having an iron loss reduced in a wide sheet thickness range can be obtained by forming a closure domain shape that is advantageous for iron loss reduction using the characteristics of an electron beam.

In addition, Patent Document 9 discloses a grain-oriented electrical steel sheet for a core having linear strains formed by an electron beam emitted from $LaB_6$ in directions at 60° to 120° with respect to a rolling direction in a steel sheet surface.

In addition, Patent Document 10 discloses a grain-oriented electrical steel sheet having excellent insulation properties and corrosion resistance in which the area proportion of a beam irradiation mark in a beam irradiation region is controlled and a method for manufacturing the same.

However, Patent Documents 6 to 10 are all techniques for controlling closure domains for reducing iron losses or for improving the characteristics of coatings that are formed in association with the control of closure domains, and no studies were conducted regarding the control of closure domains for realizing low noise. Therefore, it was found that, in the techniques of Patent Documents 6 to 10, the improvement in noise characteristics is not sufficient with respect to a superior iron loss/noise balance that has been required in recent years.

PRIOR ART DOCUMENT

Patent Document

[Patent Document 1] Japanese Patent No. 4669565
[Patent Document 2] Japanese Patent No. 4510757
[Patent Document 3] Japanese Patent No. 3361709
[Patent Document 4] Japanese Patent No. 6060988
[Patent Document 5] Japanese Patent No. 6176282
[Patent Document 6] Japanese Patent No. 6169695
[Patent Document 7] Japanese Patent No. 6245296
[Patent Document 8] PCT International Publication No. WO 2014/068962
[Patent Document 9] Japanese Patent No. 5954421
[Patent Document 10] PCT International Publication No. WO 2013/099272

DISCLOSURE OF THE INVENTION

Problems to be Solved by the Invention

As described above, conventionally, grain-oriented electrical steel sheets having iron loss characteristics and noise characteristics which are improved sufficiently at the same time and methods for manufacturing the same have not been disclosed.

An object of the present invention is to provide a grain-oriented electrical steel sheet having excellent iron loss characteristics, particularly, an iron loss improvement ratio before and after magnetic domain control, and noise characteristics and a method for manufacturing the same.

Means for Solving the Problem

In a grain-oriented electrical steel sheet, an irradiated portion is rapidly heated and rapidly cooled by irradiation with an energy ray such as a laser beam or an electron beam. As a result, a residual strain (thermal strain) is generated in the steel sheet near the irradiated portion. In a case where this residual strain is a compressive strain in the rolling direction or a tensile strain in the sheet thickness direction, a closure domain is formed in a region where this residual strain is generated. Leakage magnetic flux is generated on the surface of the steel sheet due to the formation of this closure domain, and the magnetostatic energy becomes high. A state in which the magnetostatic energy is high is energetically unstable. Therefore, the magnetic domain structure of the steel sheet changes to a structure in which the leakage magnetic flux becomes small. The structure in which the leakage magnetic flux becomes small is, that is, a state in which there are many interfaces between 180° magnetic domains parallel/antiparallel to the rolling direction, that is, 180° magnetic walls, which is so-called "magnetic domain segmentation". Since this magnetic domain segmentation reduces the abnormal eddy-current loss, irradiation with energy rays is advantageous for reducing iron losses. However, ordinarily, when a closure domain is formed, the degree of magnetostriction becomes large, and thus noise when the steel sheet is incorporated into a transformer or the like becomes large.

The present inventors studied the relationship between irradiation conditions of a laser beam, an electron beam, or the like and iron loss characteristics and noise characteristics. As a result, it was found that the noise characteristics are improved by reducing the input energy of the laser beam, the electron beam, or the like; however, in this case, magnetic domain control is not sufficient, and the iron loss characteristics are not sufficiently improved.

Therefore, the present inventors further studied a method for improving the iron loss characteristics without degrading the noise characteristics. As a result, it was found that, when irradiation conditions of a laser beam, an electron beam, or the like and the decarburization annealing conditions are controlled in the manufacturing process, even in a case where the input energy of the laser beam, the electron beam, or the like is small, it is possible to achieve sufficient magnetic domain segmentation and to satisfy both a low iron loss and a low noise after irradiation with the laser beam, the electron beam, or the like.

The present invention has been made in view of the above-described findings. The gist of the present invention is as described below.

[1] A grain-oriented electrical steel sheet according to one aspect of the present invention includes a base steel sheet, a glass coating formed on the base steel sheet, and a tension-applied insulation coating formed on the glass coating, the base steel sheet has the chemical composition, by mass %, C: 0.010% or less, Si: 3.00% to 4.00%, Mn: 0.01% to 0.50%, and N: 0.010% or less, Sol. Al: 0.020% or less, P: 0.030% or less, S: 0.010% or less, Sn: 0% to 0.50%, Cu: 0% to 0.50%, Cr: 0% to 0.50%, Se: 0% to 0.020%, Sb: 0% to 0.500%, Mo: 0% to 0.10%, and a remainder of Fe and impurities, in which, on a front surface of the base steel sheet, a plurality of linear strains that extend continuously or intermittently in a direction intersecting with a rolling direction are present, intervals p in the rolling direction of the plurality of linear strains adjacent to each other are 3.0 to 9.0 mm, widths of the linear strains are 10 to 250 μm, and, in an X-ray topographic spectrum in a range of 1.50 mm in the rolling direction that is obtained from an X-ray topographic image of the front surface and includes the linear strain at a center, a full width at half maximum of a peak of the X-ray topographic spectrum including a maximum value of a spectral intensity is 0.02 mm or more and 0.10 mm or less.

[2] The grain-oriented electrical steel sheet according to [1], in which, when a range of 3.0 mm in the rolling direction on the front surface that includes the linear strain at a center is irradiated with an X-ray beam, a minimum value of an X-ray reflection intensity of a (310) plane is denoted by $I_{min}$, a background intensity is denoted by $I_0$, and when a range of 3.0 mm in the rolling direction on a rear surface that includes the linear strain at a center is irradiated with an X-ray beam, a minimum value of an X-ray reflection intensity of an obtained diffraction plane (310) plane is represented by $J_{min}$, and a background intensity is represented by $J_0$, the $I_{min}$, the $I_0$, the $J_{min}$, and the $J_0$ may satisfy the following expression (2).

$$0.02 \le |J_0 - J_{min}|/|I_0 - I_{min}| \le 1.00 \quad (2)$$

[3] The grain-oriented electrical steel sheet according to [1] or [2], in which the chemical composition of the base steel sheet may contain either or both of Sn: 0.01% to 0.50% and Cu: 0.05% to 0.50%.

[4] A method for manufacturing a grain-oriented electrical steel sheet according to another aspect of the present invention is a method for manufacturing the grain-oriented electrical steel sheet according to [1] or [2], the method having a hot rolling step of heating and then hot-rolling a steel piece having the chemical composition, by mass %, C: 0.010% to 0.200%, Si: 3.00% to 4.00%, Mn: 0.01% to 0.50%, N: 0.020% or less, Sol. Al: 0.010% to 0.040%, P: 0.030% or less, S: 0.005% to 0.040%, Sn: 0% to 0.50%, Cu: 0% to 0.50%, Bi: 0% to 0.020%, Cr: 0% to 0.50%, Se: 0% to 0.020%, Sb: 0% to 0.500%, Mo: 0% to 0.10%, and a remainder of Fe and impurities to obtain a hot-rolled steel sheet, a hot-rolled sheet annealing step of performing hot-rolled sheet annealing on the hot-rolled steel sheet, a cold rolling step of performing cold rolling once or a plurality of times with process annealing therebetween on the hot-rolled steel sheet after the hot-rolled sheet annealing step to obtain a cold-rolled steel sheet, a decarburization annealing step of performing decarburization annealing on the cold-rolled steel sheet, a final annealing step of applying and drying an annealing separating agent containing MgO as a main component on front and rear surfaces of the cold-rolled steel sheet after the decarburization annealing step that is a base steel sheet and performing final annealing to form a glass coating, a coating-forming step of forming a tension-applied insulation coating on the glass coating to obtain a grain-oriented electrical steel sheet including the base steel sheet, the glass coating formed on the base steel sheet, and the tension-applied insulation coating formed on the glass coating, and a magnetic domain segmentation step of irradiating a front surface of the tension-applied insulation coating of the grain-oriented electrical steel sheet with an energy ray to apply a plurality of linear strains to the base steel sheet, in which, in the magnetic domain segmentation step, among the plurality of linear strains, intervals in a rolling direction of linear strains adjacent to each other are 3.0 to 9.0 mm, an energy ray power density Ip in a unit of $W/mm^2$ that is defined by (P/S) using an energy ray output P in a unit of W and an energy ray irradiation cross-sectional area S in a unit of $mm^2$ satisfies the following expression (3), an energy ray input energy Up in a unit of J/mm that is defined by (P/Vs) using the energy ray output P and an energy ray scanning velocity Vs in a unit of mm/sec satisfies the following expression (4), a beam aspect ratio that is defined by (dl/dc) using a diameter dl in a direction perpendicular to a beam scanning direction and a diameter dc in the beam scanning direction of the energy ray in a unit of μm and the dl each satisfy the following expression (5) and the following expression (6), and, in the decarburization annealing step, a temperature rising rate S1 in a first temperature range of 550° C. to 750° C. is set to 500° C./sec or faster, and a temperature rising rate S2 in a second temperature range of 750° C. to 800° C. is set to 800° C./sec or faster or a temperature rising rate S2 in the second temperature range is set to 50° C./sec or faster, and an atmospheric dew point in the second temperature range is set to −50° C. to 20° C.

$$250 \le Ip \le 2000 \quad (3)$$

$$0.005 < Up \le 0.050 \quad (4)$$

$$0.001 < dl/dc < 1.000 \quad (5)$$

$$10 \le dl < 200 \quad (6)$$

[5] The method for manufacturing the grain-oriented electrical steel sheet according to [4] may further have a nitriding treatment step of performing a nitriding treatment on the cold-rolled steel sheet between the decarburization annealing step and the final annealing step.

[6] The method for manufacturing the grain-oriented electrical steel sheet according to [4] or [5], in which the chemical composition of the steel piece may contain either or both of Sn: 0.01% to 0.50% and Cu: 0.05% to 0.50%.

Effects of the Invention

According to the above-described aspects of the present invention, it is possible to provide a grain-oriented electrical steel sheet having excellent iron loss characteristics and noise characteristics and a method for manufacturing the same.

EMBODIMENTS OF THE INVENTION

Figure 1:
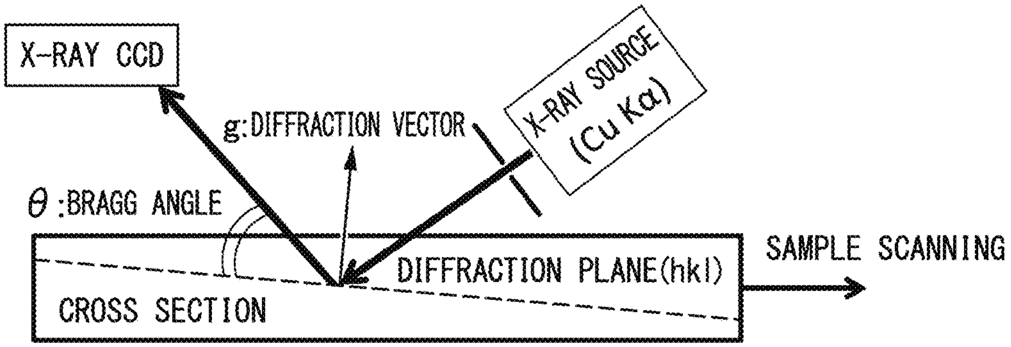
FIG. 1 is a view showing a measurement geometry of X-ray topography.

A grain-oriented electrical steel sheet according to one embodiment of the present invention (the grain-oriented electrical steel sheet according to the present embodiment) includes a base steel sheet having a predetermined chemical composition, a glass coating formed on the base steel sheet, and a tension-applied insulation coating formed on the glass coating.

In addition, on a front surface of the base steel sheet, a plurality of linear strains (thermal strains) that extend continuously or intermittently in directions intersecting with a rolling direction, more specifically, directions at an angle (ϕ) of 60° to 120° with respect to the rolling direction, is formed approximately in parallel, intervals (p) in the rolling direction of the plurality of linear strains adjacent to each other are 3.0 to 9.0 mm, and the width (length in a direction orthogonal to an extension direction) of each of the plurality of linear strains measured by X-ray topography is 10 to 250 μm.

In addition, in the grain-oriented electrical steel sheet according to the present embodiment, in an X-ray topographic spectrum in a range of 1.50 mm in the rolling direction including the linear strain at the center (a range of ±0.75 mm in the rolling direction from the linear strain) that is obtained from an X-ray topographic image of the front surface, the full width at half maximum of a peak of the X-ray topographic spectrum including the maximum value of the spectral intensity is 0.02 mm or more and 0.10 mm or less.

Hereinafter, the grain-oriented electrical steel sheet according to the present embodiment will be described.

<Base Steel Sheet>

(Chemical Composition)

The grain-oriented electrical steel sheet according to the present embodiment is largely characterized by the state of linear strains, and the base steel sheet in the grain-oriented electrical steel sheet is not limited in terms of the chemical composition. However, in order to obtain characteristics that are ordinarily required for grain-oriented electrical steel sheets, the chemical composition is set within the following ranges. In the present embodiment, % relating to the content of each element is "mass %" unless otherwise specified.

C: 0.010% or Less

C (carbon) is an element effective for the microstructure control of the steel sheet in steps until the completion of a decarburization annealing step in manufacturing steps. However, when the C content exceeds 0.010%, the magnetic characteristics (iron loss characteristics or magnetic flux density) of the grain-oriented electrical steel sheet, which is a product sheet, deteriorate. Therefore, in the base steel sheet of the grain-oriented electrical steel sheet according to the present embodiment, the C content is set to 0.010% or less. The C content is preferably 0.005% or less. The C content is preferably as low as possible; however, even when the C content is reduced to less than 0.0001%, the effect of the microstructure control is saturated, and only the manufacturing cost increases. Therefore, the C content may be set to 0.0001% or more.

Si: 3.00% to 4.00%

Si (silicon) is an element that improves the iron loss characteristics by increasing the electric resistance of the grain-oriented electrical steel sheet. When the Si content is less than 3.00%, a sufficient effect of reducing an eddy-current loss cannot be obtained. Therefore, the Si content is set to 3.00% or more. The Si content is preferably 3.20% or more and more preferably 3.50% or more.

On the other hand, when the Si content exceeds 4.00%, the grain-oriented electrical steel sheet is embrittled, and the passability significantly deteriorates. In addition, the workability of the grain-oriented electrical steel sheet deteriorates, and the steel sheet may break during rolling. Therefore, the Si content is set to 4.00% or less. The Si content is preferably 3.80% or less and more preferably 3.70% or less.

There are cases where a part of Si contained in a steel piece such as a slab is consumed for forming a glass coating containing $Mg_2SiO_4$ as a main component. Therefore, in the grain-oriented electrical steel sheet, the Si content may be reduced compared with that at the time of tapping.

Mn: 0.01% to 0.50%

Mn (manganese) is an element that bonds to S to form MnS in the manufacturing steps. This precipitate functions as an inhibitor (an inhibitor of normal grain growth) and develops secondary recrystallization in steel. Mn is also an element that further enhances the hot workability of steel. In a case where the Mn content is less than 0.01%, it is not possible to sufficiently obtain the above-described effect. Therefore, the Mn content is set to 0.01% or more. The Mn content is preferably 0.02% or more and more preferably 0.05% or more.

On the other hand, when the Mn content exceeds 0.50%, secondary recrystallization does not occur, and the magnetic characteristics of steel deteriorate. Therefore, in the base steel sheet of the grain-oriented electrical steel sheet according to the present embodiment, the Mn content is set to 0.50% or less. The Mn content is preferably 0.20% or less and more preferably 0.10% or less.

N: 0.010% or Less

N (nitrogen) is an element that bonds to Al to form AlN, which functions as an inhibitor in the manufacturing steps. However, when the N content exceeds 0.010%, the magnetic characteristics deteriorate due to an inhibitor excessively remaining in the base steel sheet. Therefore, in the base steel sheet of the grain-oriented electrical steel sheet according to the present embodiment, the N content is set to 0.010% or less. The N content is preferably 0.008% or less and more preferably 0.005% or less.

On the other hand, the lower limit of the N content is not particularly specified; however, even when the N content is reduced to less than 0.0001%, only the manufacturing cost increases. Therefore, the N content may be set to 0.0001% or more.

Sol. Al: 0.020% or Less

Sol. Al (acid-soluble aluminum) is an element that bonds to N to form AlN that functions as an inhibitor in the manufacturing steps. However, when the Sol. Al content of the base steel sheet exceeds 0.020%, the magnetic characteristics deteriorate due to the inhibitor excessively remaining in the base steel sheet. Therefore, in the base steel sheet of the grain-oriented electrical steel sheet according to the present embodiment, the Sol. Al content is set to 0.020% or less. The Sol. Al content in the grain-oriented electrical steel sheet is preferably as low as possible. For example, the Sol. Al content is 0.010% or less or less than 0.001% and may be 0%.

On the other hand, the lower limit of the Sol. Al content is not particularly specified; however, even when the Sol. Al content is reduced to less than 0.0001%, only the manufacturing cost increases. Therefore, the Sol. Al content may be set to 0.0001% or more.

P: 0.030% or Less

P (phosphorus) is an element that degrades the workability in rolling. When the P content is set to 0.030% or less, it is possible to suppress excessive deterioration of the rolling workability and to suppress breakage during manufacturing. From such a viewpoint, the P content is set to 0.030% or less. The P content is preferably 0.020% or less and more preferably 0.010% or less.

The lower limit of the P content is not limited and may be 0%; however, the detection limit of chemical analysis is 0.0001%, and thus the substantial lower limit of the P content in practical steel sheets is 0.0001%. In addition, P is also an element having an effect of improving the texture and improving the magnetic characteristics. In order to obtain this effect, the P content may be set to 0.001% or more or may be set to 0.005% or more.

S: 0.010% or Less

S (sulfur) is an element that bonds to Mn to form MnS that functions as an inhibitor in the manufacturing steps. However, in a case where the S content exceeds 0.010%, the magnetic characteristics deteriorate due to an excessively remaining inhibitor. Therefore, in the base steel sheet of the grain-oriented electrical steel sheet according to the present embodiment, the S content is set to 0.010% or less. The S content in the grain-oriented electrical steel sheet is preferably as low as possible. For example, the S content is less than 0.0001% and may be 0%. However, even when the S content in the base steel sheet of the grain-oriented electrical steel sheet is reduced to less than 0.0001%, only the manufacturing cost increases. Therefore, the S content may be 0.0001% or more.

Remainder: Fe and Impurities

The chemical composition of the base steel sheet of the grain-oriented electrical steel sheet according to the present embodiment contains the above-described essential elements, and the remainder may be Fe and impurities. However, for the purpose of enhancing the magnetic characteristics and the like, as optional elements, Sn, Cu, Cr, Se, Sb, and Mo may be further contained in ranges to be shown below. These elements are also allowed to be contained as impurities.

In addition, even when, for example, any one or more of W, Nb, Bi, Ti, Ni, Co, and V are contained in a total of 1.0% or less as elements other than these, the effect of the grain-oriented electrical steel sheet according to the present embodiment is not impaired.

Here, the impurities are elements that are incorporated from ore or scraps as a raw material, manufacturing environments, or the like at the time of industrially manufacturing the base steel sheet and are allowed to be contained in contents at which the action of the grain-oriented electrical steel sheet according to the present embodiment is not adversely affected.

Sn: 0% to 0.50%

Sn (tin) is an element that increases Goss orientation and is an element effective for refining secondary recrystallized grains. When secondary recrystallized grains are small, at the time of performing magnetic domain segmentation, a sufficient iron loss improvement effect can be obtained even when the input energy is small. In the case of obtaining the above-described effect, the Sn content is preferably set to 0.01% or more. The Sn content is more preferably 0.02% or more and still more preferably 0.03% or more. However, when Sn is contained, there is concern that the Goss orientation occupancy ratio in the secondary recrystallization structure may decrease. Therefore, in the base steel sheet of the grain-oriented electrical steel sheet according to the present embodiment, in a case where Sn is contained, Sn is preferably contained at the same time as Cu to be described below.

On the other hand, in a case where the Sn content exceeds 0.50%, secondary recrystallization becomes unstable, and the magnetic characteristics deteriorate. Therefore, even in a case where Sn is contained, the Sn content is set to 0.50% or less. The Sn content is preferably 0.30% or less and more preferably 0.20% or less.

Cu: 0% to 0.50%

Cu (copper) is an element that contributes to an increase in the Goss orientation occupancy ratio in the secondary recrystallization structure. In the case of obtaining the above-described effect, the Cu content is preferably set to 0.05% or more. The Cu content is more preferably 0.06% or more and still more preferably 0.07% or more.

On the other hand, in a case where the Cu content exceeds 0.50%, the steel sheet is embrittled during hot rolling. Therefore, in the base steel sheet of the grain-oriented electrical steel sheet according to the present embodiment, the Cu content is set to 0.50% or less even in a case where Cu is contained. The Cu content is preferably 0.30% or less and more preferably 0.20% or less.

Cr: 0% to 0.50%

Cr (chromium) is an element that improves the magnetic characteristics. The reason is not clear, but Cr is considered to have an effect of contributing to an increase in the Goss orientation occupancy ratio in the secondary recrystallization structure to improve the magnetic characteristics. In order to obtain the above-described effect, the Cr content is preferably set to 0.01% or more, more preferably set to 0.02% or more, and still more preferably set to 0.03% or more.

On the other hand, in a case where the Cr content exceeds 0.50%, a Cr oxide is formed, and the magnetic characteristics deteriorate. Therefore, even in a case where Cr is contained, the Cr content is set to 0.50% or less. The Cr content is preferably 0.30% or less and more preferably 0.10% or less.

Se: 0% to 0.020%

Se (selenium) is an element having an effect of improving the magnetic characteristics. Therefore, Se may be contained. In a case where Se is contained, the Se content is preferably set to 0.001% or more in order to favorably exhibit the effect of improving the magnetic characteristics. The Se content is more preferably 0.003% or more and still more preferably 0.006% or more.

On the other hand, when the Se content exceeds 0.020%, the adhesion of the glass coating deteriorates. Therefore, even in a case where Se is contained, the Se content is set to 0.020% or less. The Se content is preferably 0.015% or less and more preferably 0.010% or less.

Sb: 0% to 0.500%

Sb (antimony) is an element having an effect of improving the magnetic characteristics. Therefore, Sb may be contained. In a case where Sb is contained, the Sb content is preferably set to 0.005% or more in order to favorably exhibit the effect of improving the magnetic characteristics. The Sb content is more preferably 0.010% or more and still more preferably 0.020% or more.

On the other hand, when the Sb content exceeds 0.500%, the adhesion of the glass coating significantly deteriorates. Therefore, even in a case where Sb is contained, the Sb content is set to 0.500% or less. The Sb content is preferably 0.300% or less and more preferably 0.100% or less.

Mo: 0% to 0.10%

Mo (molybdenum) is an element having an effect of improving the magnetic characteristics. Therefore, Mo may be contained. In a case where Mo is contained, the Mo content is preferably set to 0.01% or more in order to favorably exhibit the effect of improving the magnetic characteristics. The Mo content is more preferably 0.02% or more and still more preferably 0.03% or more.

On the other hand, when the Mo content exceeds 0.10%, the cold rollability deteriorates, and there is a possibility that the base steel sheet may break. Therefore, even in a case where Mo is contained, the Mo content is set to 0.10% or less. The Mo content is preferably 0.08% or less and more preferably 0.05% or less.

As described above, it is exemplified that the chemical composition of the base steel sheet of the grain-oriented electrical steel sheet according to the present embodiment contains the above-described essential elements with the remainder of Fe and impurities or the chemical composition contains the above-described essential elements and further contains one or more of the optional elements with the remainder of Fe and impurities.

The chemical composition of the base steel sheet of the grain-oriented electrical steel sheet according to the present embodiment can be measured after the glass coating and the tension-applied insulation coating formed on the surface are removed.

Specifically, the grain-oriented electrical steel sheet is immersed in a sodium hydroxide aqueous solution (80° C. to 90° C.) containing NaOH: 30 to 50 mass % and $H_2O$: 50 to 70 mass % for 7 to 10 minutes, whereby the tension-applied insulation coating is removed. The grain-oriented electrical steel sheet from which the tension-applied insulation coating has been removed is washed with water and, after being washed with water, dried with a warm air blower for little less than 1 minute. The dried grain-oriented electrical steel sheet (the grain-oriented electrical steel sheet not including the tension-applied insulation coating) is immersed in a hydrochloric acid aqueous solution (80° C. to 90° C.) containing 30 to 40 mass % of HCl for 1 to 10 minutes, whereby the glass coating is removed. The base steel sheet after immersion is washed with water and, after being washed with water, dried with a warm air blower for little less than 1 minute.

The base steel sheet can be taken out from the grain-oriented electrical steel sheet by the above-described step.

The chemical composition of such a base steel sheet is obtained by a well-known component analysis method. Specifically, chips are generated from the base steel sheet using a drill, the chips are collected, and the collected chips are dissolved in an acid to obtain a solution. ICP-AES is performed on the solution to perform an elemental analysis of the chemical composition.

Here, Si in the chemical composition of the base steel sheet is obtained by a method specified in JIS G 1212 (1997) (Methods for Determination of Silicon Content). Specifically, when the above-described chips are dissolved in an acid, silicon oxide precipitates as a precipitate, and thus this precipitate (silicon oxide) is filtered out with filter paper, and the mass is measured, thereby obtaining the Si content.

The C content and the S content are obtained by a well-known high-frequency combustion method (combustion-infrared absorption method). Specifically, the above-described solution is combusted by high-frequency heating in an oxygen stream, carbon dioxide and sulfur dioxide generated are detected, and the C content and the S content are obtained.

The N content is obtained using a well-known inert gas melting-thermal conductivity method.

(Linear Strains)

In the base steel sheet included in the grain-oriented electrical steel sheet according to the present embodiment, a plurality of linear strains (thermal strains), which are residual strains formed by irradiation with an energy ray such as a laser beam or an electron beam, are present near the front surface. Each of the plurality of linear strains extends continuously or intermittently in a direction (direction intersecting with a rolling direction) at an angle $\phi$ of 60° to 120° with respect to the rolling direction. The strain may be present continuously in a linear shape or may be present in one direction intermittently (for example, in a dotted line shape).

It is known that the strains (residual strains) formed by such irradiation with an energy ray are compressive strains particularly in the rolling direction and are tensile strains in the sheet thickness direction and regions magnetized in the sheet thickness direction, which are called closure domains, are formed in the strain portions and on the lower side thereof in the sheet thickness direction. In a case where the sizes of the closure domains are equal to or larger than a predetermined size, the 180° magnetic domain widths are segmented, the eddy-current loss reduces, and the iron loss reduces. On the other hand, when the closure domain sizes become large, magnetostriction when the closure domains have been excited by AC becomes large, and noise is apparently generated in transformers.

As a result of the present inventors' studies, it was found that, when the widths of strains that are formed on the front surface and the introduced states of the strains in the sheet thickness direction are controlled, the iron losses reduce (the iron loss characteristics are improved), and a noise problem becoming apparent is suppressed (the noise characteristics are improved).

As described above, the closure domains that are formed in association with the formation of the residual strains are a driving force of 180° magnetic domain segmentation, which is advantageous for a decrease in the iron loss, but there has been a problem in that the degree of magnetostriction is increased due to the closure domains and noise when the grain-oriented electrical steel sheet has been incorporated into a transformer becomes large (the noise characteristics deteriorate). Conventionally, in the case of suppressing the deterioration of the noise characteristics, measures such as an increase in the irradiation pitches of an energy ray or a decrease in the input energy of an energy ray have been performed. However, such measures are merely means for improving the noise characteristics by sacrificing the effect of improving iron losses by energy ray irradiation to a certain extent with an assumption that the iron loss characteristics and the noise characteristics are in a trade-off relationship.

In contrast, as a result of the present inventors' studies, it was found that, in grain-oriented electrical steel sheets, when strains are introduced so that closure domain regions are formed shallow below the surface (localized in the surface layer), it is possible to improve the iron loss characteristics while suppressing the deterioration of the noise characteristics. That is, the present inventors found that the control of the spatial distribution of strains is important from the viewpoint of reducing the iron loss and noise at the same time. The spatial distribution state of strains can be identified using an X-ray diffraction analysis method called X-ray topography.

While the detail will be described below, in a portion where strain introduction is particularly strong, for example, a portion where the input energy is particularly high in an energy ray-irradiated portion, the lattice is distorted so severely that a diffraction phenomenon itself does not occur (high strain introduction region). In X-ray topography, in such a portion, diffraction itself does not occur, and thus the X-ray topographic image becomes white. Therefore, the X-ray topographic spectrum that is obtained from the image shows low intensities (low pixel values).

On the other hand, in a case where a region in which a diffraction phenomenon occurs but residual strains have been introduced (a region with a relatively low dislocation density) is present, the X-ray topographic image becomes black. Therefore, the X-ray topographic spectrum that is obtained from the image shows high intensities (high pixel values). This residual strain region in which a diffraction phenomenon occurs has a magnetic domain segmentation effect (iron loss improvement effect), but the crystal lattice itself is not impaired. Therefore, an adverse influence on noise is limited.

Therefore, what is important in terms of satisfying both excellent iron loss characteristics and excellent noise characteristics is to introduce an appropriate amount of a residual strain region in which a diffraction phenomenon occurs.

In the grain-oriented electrical steel sheet according to the present embodiment, in order to satisfy both excellent iron loss characteristics and excellent noise characteristics, the width of each of a plurality of linear strains measured by X-ray topography is 10 to 250 μm, and in an X-ray topographic spectrum in a range of 1.50 mm in the rolling direction including the linear strain at the center, that is obtained from the X-ray topographic image of the front surface, the full width at half maximum of a peak of the X-ray topographic spectrum including the maximum value of the spectral intensity is 0.02 mm or more and 0.10 mm or less.

When the width of the linear strain is less than 10 μm, the effect of improving the iron loss cannot be obtained. In addition, it is industrially difficult to make the beam diameter less than 10 μm. Therefore, the width of the strain is set to 10 μm or more. The width of the strain is preferably 50 μm or more.

On the other hand, when the width of the strain is more than 250 μm, the volume of the closure domain that is formed in association with the strain increases, and the degree of magnetostriction increases. Therefore, the width of the strain is set to 250 μm or less. The width of the strain is preferably 200 μm or less and more preferably 150 μm or less.

In addition, in a case where the full width at half maximum of the peak of the X-ray topographic spectrum is less than 0.02 mm, the strain introduction range is small, and the iron loss improvement effect cannot be obtained. On the other hand, in a case where the full width at half maximum is more than 0.10 mm, strains have been excessively introduced, and the noise characteristic improvement effect cannot be obtained. A preferable range of the full width at half maximum of the peak of the X-ray topographic spectrum is 0.03 mm or more and 0.08 mm or less, and a more preferable range is 0.03 mm or more and 0.06 mm or less.

The full width at half maximum of the peak of the X-ray topographic spectrum is affected by the crystal orientation of a base metal. Therefore, in a case where the predetermined full width at half maximum is set, it is necessary to increase the sharpness of the crystal orientation of Goss orientation by, for example, increasing the temperature rising rate of decarburization annealing as described below. In a case where the sharpness of the crystal orientation of Goss orientation is poor, when a strain introduction-type magnetic domain control is performed, the full width at half maximum exceeds 0.10 mm, and the noise characteristic improvement effect cannot be obtained.

The widths of the linear strains are measured by the following method using X-ray topography (XRT) (for example, X-ray topography imaging system XRTmicron manufactured by Rigaku Corporation). As the target of an X-ray source, Cu is used, and the voltage and the current are each set to 40 kV and 30 mA. The CCD resolution in a detector is set to Binning 1×1 (5.4 μm). The visual field size in CCD is set to 17 mm×13.5 mm (3326 pixels×2540 pixels), and the digital resolution is set to 16 bits (65536 gradations).

Figure 2:
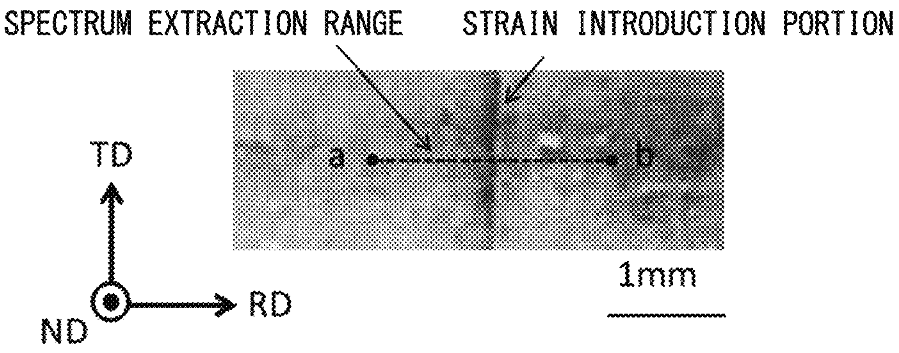
FIG. 2 is a view showing an example of image data of the X-ray topography.

First, a steel sheet sample is irradiated with an X-ray beam so as to satisfy Bragg diffraction conditions, and the diffracted X-ray beam is exposed to a detector (CCD camera), thereby collecting the mapping data of diffracted X-ray intensities. The diffracted X-ray intensities are converted to color densities, and the region scanned with the X-ray is displayed as a color density distribution image. Therefore, an X-ray topographic image (the mapping data of diffracted X-ray intensities) is obtained. As the diffracted X-ray intensity increases, the color density in the X-ray topographic image tends to become darker (negative display). In addition, there are cases where a measurement position where the intensity can be maximized is adjusted by locking curve measurement. Specifically, a curve for which the horizontal axis indicates the X-ray incident angle θs (°) and the vertical axis indicates the diffracted X-ray intensity is swept, and $\theta s^{max}$ (°) at which the highest intensity can be obtained is searched for. Here, in the present invention, the X-ray topographic image is obtained at a position where θs (°)=$\theta s^{max}$+up to 0.09 (corresponding to the use of the same method as a weak beam method in the dark visual field image observation with a transmission electron microscope (TEM)). For example, the peak position of the locking curve is at an X-ray incident angle θs (°)=32.8343° and an X-ray emission angle θd=83.5257°, whereas the capturing position of the X-ray topography may be at θs=32.9200° and Θd=83.4400°. FIG. 2 shows an example of the X-ray topographic image.

Upon measurement, for example, a sample that is 50 mm in the width direction (TD direction) and 150 mm in the rolling direction (RD direction) is collected from the grain-oriented electrical steel sheet, the front surface of this sample is irradiated with an X-ray beam (Cu Kα ray) so that the Bragg diffraction conditions are satisfied with respect to a desired diffraction plane (hkl), the intensities of the reflected diffracted X-ray at that time are measured with a high-resolution CCD camera or the like, and a mapping image of the diffracted X-ray intensities is created (refer to FIG. 1). At that time, a still image of a diffraction image is captured in a state where the sample is left still (snap shot) without performing a TDI (time delay integration) scanning. Since the diffracted X-ray from each position in the sample makes each pixel of the CCD camera exposed and makes charges accumulated, the mapping data of the diffracted X-ray intensities are created by scanning the sample and reading the exposed charges at each position.

A condition in which the RD-axis direction (rolling direction) of the sample and the incidence and reflection directions of the X-ray beam are parallel to each other is referred to as a g=222 measurement condition or a diffraction plane (222) condition. On the other hand, a condition in which the TD axis of the sample and the incidence and reflection directions of the X-ray beam are parallel to each other is referred to as a g=310 measurement condition or a diffraction plane (310) condition. In the present embodiment, unless particularly otherwise specified, the diffraction plane (310) condition is adopted as the measurement condition.

From this mapping image, a plurality of linear places that extend at substantially equal intervals in a direction at an angle ϕ of 60° to 120° with respect to the rolling direction of the steel sheet and have a lower intensity than the average value of the X-ray diffraction intensities of the entire mapping data (portions having a low color density and thus looking white) are determined as linear strains introduced by the energy ray.

Figure 3:
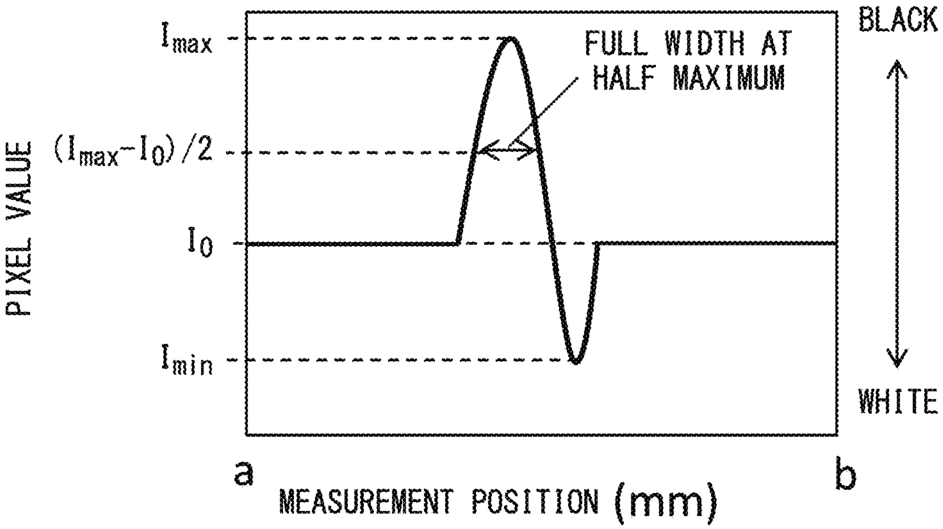
FIG. 3 is a view showing an example of a distribution curve (line profile) of reflected diffracted X-ray intensities.

The widths of the linear strains and the full width at half maximum of the peak of the X-ray topographic spectrum are obtained by the following method. That is, in a linear strain on the X-ray topographic image obtained by the above-described method, a position where the intensity is lowest is defined as the center position of the strain. Color density data (pixel values) are obtained with respect to portions on a straight line connecting two desired points so that a range of 1.50 mm in the rolling direction that includes the strain at the center (a range of ±0.75 mm in the rolling direction that includes the linear strain at the center) becomes a target. These data are plotted so that the measurement positions are indicated along the horizontal axis and the pixel values are indicated along the vertical axis as shown in FIG. 3, thereby obtaining a distribution curve (line profile) of the reflected diffracted X-ray intensities (this curve is referred to as the X-ray topographic spectrum. The pixel values along the vertical axis corresponds to the reflected diffracted X-ray intensities).

In this line profile, the maximum value of the reflection intensities is denoted by $I_{max}$, the background intensity is denoted by $I_0$, and, in a peak of the X-ray topographic spectrum including $I_{max}$ (a continuous curve range in which $I_{max}$ is included and the intensities are larger than $I_0$), the length between two points where the spectral intensity becomes $|I_{max}-I_0|/2$ is defined as the full width at half maximum. From the viewpoint of removing noise in the spectrum, cumulative values measured several times at the same position may be used. The X-ray topographic spectrum may be approximated as a continuous curve by a fitting treatment. A continuous curve range in which the reflection intensity is smaller than $I_0$ and the center position of the strain is included is defined as a linear strain. The reflection intensity in a region of the linear strain is denoted by Iz. The width of the strain is defined as the length between two points in a direction parallel to the rolling direction of the steel sheet sample where Iz=0.

Figure 4:
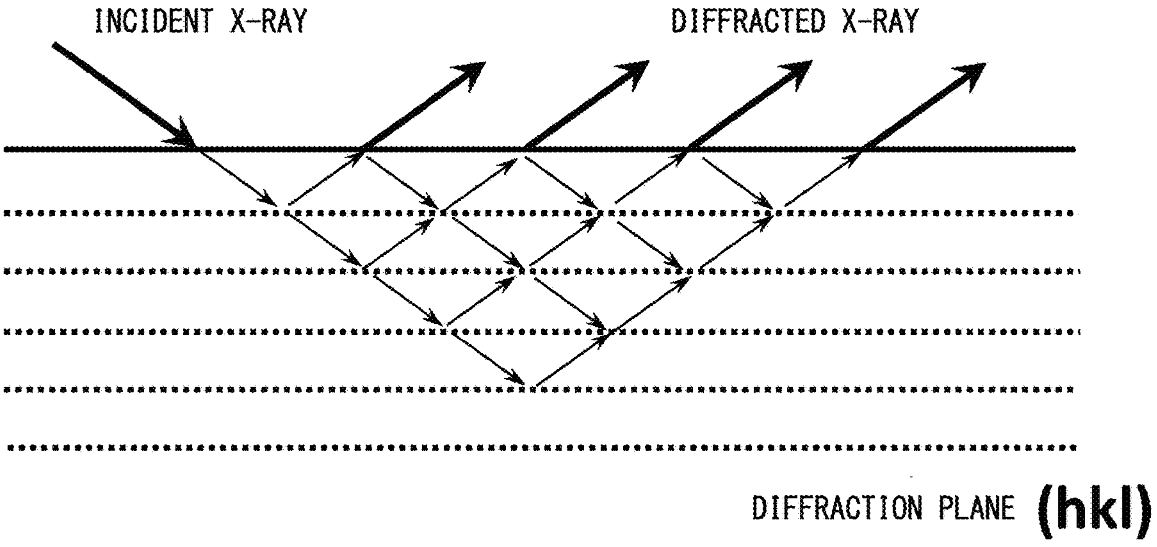
FIG. 4 is a view for describing dynamic diffraction due to multiple scattering in X-ray diffraction.
Figure 5:
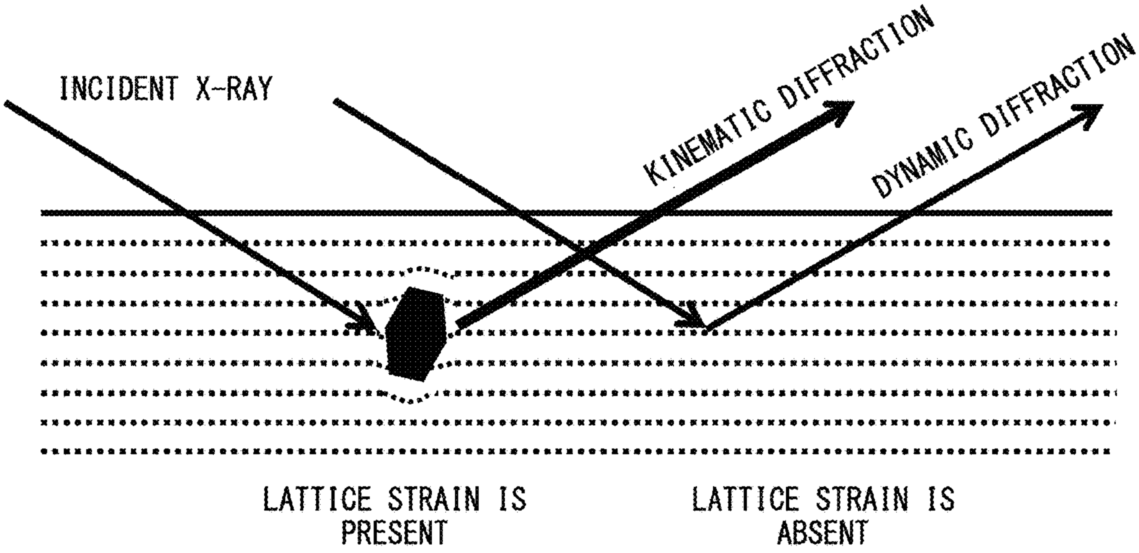
FIG. 5 is a view for describing kinematic diffraction and dynamic diffraction in X-ray diffraction.

Ordinarily, the diffracted X-ray intensity becomes higher as a strain in the crystal lattice becomes larger, becomes lower with the reduction of a strain, and becomes a constant value when a strain is zero (attenuation effect). In a crystal lattice where a strain is extremely small, as shown in FIG. 4, a traveling wave in an X-ray incidence direction and diffracted waves scattered on a diffraction plane undergo multiple interference (multiple scattering), and then propagating waves in a diffraction direction comes out from the crystal surface as a reflected diffracted X-ray (dynamic diffraction). This multiple interference in crystals occurs in a diffraction plane in which uniform and constant lattice plane spacings are continuously formed, and the wavelength of the diffracted wave at that time is a value corresponding to the diffraction plane spacing that is formed in a crystal lattice with no strains. On the other hand, in a place where a region with a large strain is locally present, since uniform and constant lattice plane spacings are not formed, multiple interference does not occur, and, instead, diffracted waves that have been scattered once at a wavelength corresponding to the distorted lattice plane spacing are generated (refer to FIG. 5). Since the wavelength of the diffracted wave generated in this locally distorted region is different from the wavelength of the diffracted wave generated by multiple scattering in the region with no strains, the diffracted wave generated in a distorted local region travels in the crystals without being involved in multiple scattering in the region with no strains and comes out as a reflected diffracted X-ray from the crystal surface (kinematic diffraction). Ordinarily, the diffracted X-ray intensity is higher in kinematic diffraction than in dynamic diffraction (attenuation effect). In addition, in a place where a number of strains are locally introduced, the spectral intensity is high due to kinematic diffraction (for example, the maximum value is denoted by $I_{max}$). On the other hand, in a place where a few strains are present (base metal), the spectral intensity becomes a certain constant value (represented by, for example, $I_o$) due to the attenuation effect. In addition, in a portion where local strains become excessive and the crystal lattice is distorted, since Bragg diffraction itself does not occur, the spectral intensity is low (for example, the minimum value is denoted by $I_{min}$).

In the grain-oriented electrical steel sheet according to the present embodiment, the extension directions of the plurality of linear strains on the front surface of the base steel sheet are in a range of 30° or less in terms of the deviation angle with respect to a direction perpendicular to the rolling direction. In other words, the plurality of linear strains extend continuously or intermittently in a direction at an angle ϕ of 60° to 120° with respect to the rolling direction. When the extension direction deviates from this angular range, the 180° magnetic domain segmentation action of the steel sheet becomes weak, and a sufficient iron loss reduction effect cannot be obtained.

In addition, the intervals in the rolling direction of the plurality of linear residual strains adjacent to each other are set to 3.0 to 9.0 mm. When the intervals in the rolling direction are more than 9.0 mm, the magnetic domain segmentation effect of 180° magnetic domains becomes weak, and thus the iron loss improvement effect is insufficient. On the other hand, when the intervals of the plurality of linear residual strains become narrow (the irradiation pitches become narrow), the iron loss tends to decrease; however, when the intervals become equal to or less than a certain threshold value, the total hysteresis loss increases, conversely, the iron loss deteriorates, and there are cases where the noise characteristics deteriorate. Therefore, each of the intervals in the rolling direction of residual strains adjacent to each other is set to 3.0 mm or more. It is preferable that the plurality of linear residual strains are substantially parallel and the intervals thereof are substantially equal intervals.

The length of the residual strain in the sheet width direction is not limited, but is preferably formed from one end to the other end portion of the base steel sheet in the width direction. In a case where the steel sheet is irradiated discontinuously (intermittently) with an energy ray, at the time of irradiating the steel sheet with the energy ray in the width direction at specific pitches, it is preferable that a major axis (length along the width direction) d0 of an energy ray-irradiated portion and a length d1 along the width direction between energy ray non-irradiated portions each sandwiched by two energy ray-irradiated portions satisfy $d1 \leq 3 \times d0$. d0 may be in a range of 50 μm or more and 50 mm or less.

The intervals of linear thermal strains adjacent to each other (the distances from the center of a linear strain to the center of an adjacent linear strain in the rolling direction) can be measured by specifying the positions of the strains under the above-described conditions using X-ray topography.

In addition, in the grain-oriented electrical steel sheet according to the present embodiment, when a range of 3.0 mm in the rolling direction on the front surface that includes the linear strain at the center is irradiated with an X-ray beam, the minimum value of the X-ray reflection intensity of a (310) plane is denoted by $I_{min}$, the background intensity is denoted by $I_0$, a range of 3.0 mm in the rolling direction on the rear surface that includes the linear strain at the center is irradiated with an X-ray beam, the minimum value of the X-ray reflection intensity of the obtained diffraction plane (310) plane is represented by $J_{min}$, and the background intensity is represented by $J_0$, it is preferable that the $I_{min}$, the $I_0$, the $J_{min}$, and the $J_0$ satisfy the following expression (2). In this case, the iron loss characteristics and the noise characteristics further improve.

$$0.02 \leq |J_0 - J_{min}| / |I_0 - I_{min}| \leq 1.00 \quad (2)$$

When the expression (2) is satisfied, a more preferable strain distribution in terms of the noise characteristics is formed. Satisfying $|J_0-J_{min}|/|I_0-I_{min}|$ means that the amount of closure domains near the rear surface is smaller than the amount of closure domains near the front surface. The reason is not clear, but is considered that there is a possibility that strains in the surface layer area on the rear surface of the strain introduction surface may have an iron loss improvement effect, and the effect can be obtained when $|J_0-J_{min}|/|I_0-I_{min}|$ is 0.02 or more.

On the other hand, the reason is not clear; however, in a case where $|J_0-J_{min}|/|I_0-I_{min}|$ exceeds 1.00, that is, the amount of closure domains near the rear surface exceeds the amount of closure domains introduced into the front surface, the noise characteristics are likely to deteriorate. Therefore, it is considered that, when $|J_0-J_{min}|/|I_0-I_{min}|$ is set to 1.00 or less, more preferable iron loss characteristics and noise characteristics can be obtained.

In addition, the X-ray reflection intensities of the diffraction planes (310) planes in ranges of 3.0 mm (±1.5 mm) in the rolling direction that include the linear strains at the center of the front surface and the rear surface are obtained by the following method.

That is, on the front surface, an X-ray topographic image (strain distribution image) is obtained under the above-described conditions. One point where a strain is present is selected on the obtained image, and, in a straight line parallel to the rolling direction (RD direction), a point A of +0.075 mm and a point B of −0.075 mm are each connected from the point with a straight line. Color density data (pixel values) are obtained from the straight line connecting the A and B. These data are plotted so that the measurement positions are indicated along the horizontal axis and the pixel values (diffraction intensities) are indicated along the vertical axis, thereby obtaining a distribution curve (line profile) of the reflected diffracted X-ray intensities. The diffraction intensity at a position where the diffraction intensity at the point A and the diffraction intensity at the point B are averaged is denoted by $I_0$. In addition, the diffraction intensity at a position where the diffraction intensity is lowest is denoted by $I_{min}$.

In addition, on the rear surface, similarly, the diffraction intensity at a position where the diffraction intensities at the start point and end point of a straight line are averaged is represented by $J_0$, and the diffraction intensity at a position where the diffraction intensity is lowest is represented by $J_{min}$.

Glass Coating

In the grain-oriented electrical steel sheet according to the present embodiment, a glass coating is formed on the surface of the base steel sheet. The glass coating may be formed on only one surface of the base steel sheet, but is preferably formed on both surfaces.

The glass coating is an inorganic coating containing magnesium silicate as a main component. The glass coating is formed by a reaction between an annealing separating agent containing magnesia (MgO) applied to the surface of the base steel sheet and a component on the surface of the base steel sheet during final annealing and has a composition derived from the annealing separating agent and the component of the base steel sheet (in more detail, a composition containing $Mg_2SiO_4$ as a main component).

Tension-Applied Insulation Coating

In the grain-oriented electrical steel sheet according to the present embodiment, a tension-applied insulation coating is formed on the surface of the glass coating. The tension-applied insulation coating may be formed on only one surface, but is preferably formed on both surfaces.

The tension-applied insulation coating applies electrical insulation properties to the grain-oriented electrical steel sheet, thereby reducing the eddy-current loss to improve the iron loss of the grain-oriented electrical steel sheet. In addition, according to the tension-applied insulation coating, in addition to the electrical insulation properties as described above, a variety of characteristics such as corrosion resistance, heat resistance, and slip resistance can be obtained.

Furthermore, the tension-applied insulation coating has a function of applying tension to the grain-oriented electrical steel sheet. When tension is applied to the grain-oriented electrical steel sheet to facilitate domain wall movement in the grain-oriented electrical steel sheet, it is possible to improve the iron loss of the grain-oriented electrical steel sheet.

The tension-applied insulation coating may be a well-known coating that is formed by, for example, applying and baking a coating liquid containing phosphate and colloidal silica as main components on the front surface of the glass coating.

<Sheet Thickness of Base Steel Sheet: 0.17 to 0.30 mm>

The sheet thickness of the base steel sheet of the grain-oriented electrical steel sheet according to the present embodiment is not limited, but is preferably 0.17 to 0.30 mm in the case of considering not only a low iron loss but also the application to cores of transformers, for which low noise and low vibration are required. As the sheet thickness is smaller, a more favorable effect of reducing the eddy-current loss can be acquired, and a more favorable iron loss can be obtained, and thus a more preferable sheet thickness of the base steel sheet is 0.23 mm or less, and a still more preferable sheet thickness is 0.20 mm or less. In order to manufacture a base steel sheet of less than 0.17 mm, a special facility becomes necessary, which is not preferable in terms of production such as an increase in the manufacturing cost. Therefore, an industrially preferable sheet thickness is 0.17 mm or more. The sheet thickness is more preferably 0.18 mm or more.

<Manufacturing Method>

The grain-oriented electrical steel sheet according to the present embodiment can be manufactured by a manufacturing method including the following steps.

(i) A hot rolling step of heating and then hot-rolling a steel piece having the chemical composition, by mass %, C: 0.010% to 0.200%, Si: 3.00% to 4.00%, Mn: 0.01% to 0.50%, N: 0.020% or less, Sol. Al: 0.010% to 0.040%, P: 0.030% or less, S: 0.005% to 0.040%, Sn: 0% to 0.50%, Cu: 0% to 0.50%, Bi: 0% to 0.020%, Cr: 0% to 0.50%, Se: 0% to 0.020%, Sb: 0% to 0.500%, Mo: 0% to 0.10%, and a remainder of Fe and impurities to obtain a hot-rolled steel sheet, (ii) a hot-rolled sheet annealing step of performing hot-rolled sheet annealing on the hot-rolled steel sheet, (iii) a cold rolling step of performing cold rolling once or a plurality of times with process annealing therebetween on the hot-rolled steel sheet after the hot-rolled sheet annealing step to obtain a cold-rolled steel sheet, (iv) a decarburization annealing step of performing decarburization annealing on the cold-rolled steel sheet, (v) a final annealing step of applying and drying an annealing separating agent containing MgO as a main component on front and rear surfaces of the cold-rolled steel sheet after the decarburization annealing step that is a base steel sheet and performing final annealing to form a glass coating, (vi) a coating-forming step of forming a tension-applied insulation coating on the glass coating to obtain a grain-oriented electrical steel sheet including the base steel sheet, the glass coating formed on the base steel sheet, and the tension-applied insulation coating formed on the glass coating, and (vii) a magnetic domain segmentation step of irradiating a front surface of the tension-applied insulation coating of the grain-oriented electrical steel sheet with an energy ray to apply a plurality of linear strains to the base steel sheet.

Hereinafter, these steps will be described in detail. In the following description, in a case where conditions in each step are not described, it is possible to perform each step by appropriately applying well-known conditions.

Hot Rolling Step

In the hot rolling step, for example, a steel piece, such as a slab, having a chemical composition, by mass %, of C: 0.010% to 0.200%, Si: 3.00% to 4.00%, Mn: 0.01% to 0.50%, N: 0.020% or less, Sol. Al: 0.010% to 0.040%, P: 0.030% or less, S: 0.005% to 0.040%, Sn: 0% to 0.50%, Cu: 0% to 0.50%, Bi: 0% to 0.020%, Cr: 0% to 0.50%, Se: 0% to 0.020%, Sb: 0% to 0.500%, Mo: 0% to 0.10%, and a remainder of Fe and impurities is heated and then hot-rolled to obtain a hot-rolled steel sheet. The heating temperature of the steel piece is not particularly limited, but is preferably set within a range of 1100° C. to 1450° C. The heating temperature is more preferably 1300° C. to 1400° C.

The hot rolling conditions are not particularly limited and may be set as appropriate based on characteristics to be required. The sheet thickness of a hot-rolled steel sheet to be obtained by hot rolling is preferably in a range of, for example, 2.0 mm or more and 3.0 mm or less.

The reason for the chemical composition of the steel piece to be set within the above-described ranges is to obtain the chemical composition of the above-described base steel sheet in consideration of the following manufacturing steps.

<Hot-Rolled Sheet Annealing Step>

The hot-rolled sheet annealing step is a step of annealing the hot-rolled steel sheet manufactured through the hot rolling step. When such an annealing treatment is performed, recrystallization occurs in the steel sheet structure, and it becomes possible to realize favorable magnetic characteristics.

In the hot-rolled sheet annealing step of the present embodiment, the hot-rolled steel sheet manufactured through the hot rolling step may be annealed according to a well-known method. Means for heating the hot-rolled steel sheet upon annealing is not particularly limited, and it is possible to adopt a well-known heating method. In addition, the annealing conditions are also not particularly limited, and it is possible to anneal the hot-rolled steel sheet, for example, within a temperature range of 900° C. to 1200° C. for 10 seconds to 5 minutes.

<Cold Rolling Step>

In the cold rolling step, cold rolling including a plurality of passes is performed on the hot-rolled steel sheet after the hot-rolled sheet annealing step to obtain a cold-rolled steel sheet having a sheet thickness of 0.17 to 0.30 mm. The cold rolling may be cold rolling that is performed once (a series of cold rolling not including process annealing), or a plurality of times of cold rolling including process annealing may be performed by stopping cold rolling and performing process annealing at least once or more before the final pass of the cold rolling step.

In a case where process annealing is performed, the hot-rolled steel sheet is preferably retained at a temperature of 1000° C. to 1200° C. for 5 to 180 seconds. The annealing atmosphere is not particularly limited. The number of times of the process annealing is preferably 3 or less in consideration of the manufacturing cost.

In addition, before the cold rolling step, pickling may be performed on the surface of the hot-rolled steel sheet under well-known conditions.

In the cold rolling step of the present embodiment, the hot-rolled steel sheet may be cold-rolled according to a well-known method to produce a cold-rolled steel sheet. For example, it is possible to make the final rolling reduction fall into a range of 80% or larger and 95% or smaller. In a case where the final rolling reduction is smaller than 80%, it is highly likely that Goss nuclei in which a {110}<001> orientation has a high development degree in the rolling direction cannot be obtained, which is not preferable. On the other hand, in a case where the final rolling reduction exceeds 95%, it is highly likely that secondary recrystallization becomes unstable in the final annealing step, which is a subsequent step, which is not preferable. When the final rolling reduction is made to fall into the above-described range, it is possible to obtain Goss nuclei in which a {110}<001> orientation has a high development degree in the rolling direction and to suppress secondary recrystallization becoming unstable.

The final rolling reduction is the cumulative rolling reduction of cold rolling and is the cumulative rolling reduction of cold rolling after final process annealing in a case where process annealing is performed.

<Decarburization Annealing Step>

In the decarburization annealing step, decarburization annealing is performed on the obtained cold-rolled steel sheet. In the decarburization annealing, the cold-rolled steel sheet is primarily recrystallized, and C, which adversely affects the magnetic characteristics, is removed from the steel sheet.

In the decarburization annealing step. Goss nuclei are increased, and secondary recrystallized grains that are obtained during final annealing to be described below are refined. When the fact that a grain boundary itself has a function as a magnetic pole (a leakage magnetic flux-generating site) is taken into account, the refinement of the secondary recrystallized grains increases the magnetostatic energy of the entire system. That is, since a state where the driving force for magnetic domain segmentation is high is formed, it is possible to satisfy both a low iron loss and low noise without relying on the excessive introduction of closure domains.

In the method for manufacturing a grain-oriented electrical steel sheet according to the present embodiment, in order to increase Goss nuclei, during heating for decarburization annealing, the temperature rising rate within a temperature range of 550° C. to 750° C. (first temperature range) is increased, and the time during which the cold-rolled steel sheet stays in the above-described temperature range is shortened. Specifically, when the temperature rising rate in the first temperature range is slower than 500° C./sec, an increase in Goss nuclei becomes insufficient. Therefore, the temperature rising rate within the temperature range of 550° C. to 750° C. is set to 500° C./sec or faster. The upper limit of the temperature rising rate is not limited; however, when the temperature rising rate is set to faster than 2000° C./sec, there is concern that the apparatus load may become excessively high. Therefore, the temperature rising rate within the temperature range of 550° C. to 750° C. may be set to 2000° C./sec or slower. Decarburization annealing under such conditions makes the sharpness of the crystal orientation after the secondary recrystallization close to ideal Goss orientation. That is, a secondary recrystallization structure where the crystal orientation dispersion is relatively small can be obtained. When strains are introduced into such a structure under conditions to be described below, it becomes possible to satisfy both a low iron loss and low noise.

However, when the cold-rolled steel sheet is heated within the temperature range of 550° C. to 750° C. at a temperature rising rate of 500° C./sec or faster, an oxide film that is formed on the surface of the steel sheet within this temperature range becomes almost $SiO_2$. This is because the formation rate of $SiO_2$ is the fastest compared with those of other oxide films. Since $SiO_2$ has an action of suppressing decarburization, it is preferable that the amount of film thickness of $SiO_2$ formed does not become excessive from the viewpoint of promoting decarburization.

In the method for manufacturing a grain-oriented electrical steel sheet according to the present embodiment, even in a case where the cold-rolled steel sheet is heated within the temperature range of 550° C. to 750° C. at a temperature rising rate of 500° C./sec or faster, when the temperature rising rate within a temperature range of 750° C. to 800° C. (second temperature range) is increased or the temperature rising rate within the temperature range of 750° C. to 800° C. is increased and the dew point atmosphere is controlled, it is possible to avoid an increase in the thickness of $SiO_2$ formed within the temperature range of 550° C. to 750° C.

Specifically, in a case where only the temperature rising rate is controlled, the temperature rising rate within a temperature range of 750° C. to 800° C. is set to 800° C./sec or faster. When the temperature rising rate is slower than 800° C./sec, it is not possible to sufficiently suppress the growth of $SiO_2$ (thickening of the oxide film). The temperature rising rate within the temperature range of 750° C. to 800° C. is preferably 1000° C./sec or faster. The upper limit of the temperature rising rate is not limited; however, when the temperature rising rate is set to faster than 2000° C./sec, there is concern that the apparatus load may become excessively high. Therefore, the temperature rising rate within the temperature range of 750° C. to 800° C. may be set to 2000° C./sec or slower.

In addition, in a case where the temperature rising rate within the temperature range of 750° C. to 800° C. (second temperature range) and the atmospheric dew point are controlled at the same time, the atmospheric dew point is set to −50° C. to 20° C., and then the temperature rising rate is set to 50° C./sec or faster from the viewpoint of suppressing the growth of $SiO_2$. When the atmospheric dew point is higher than 20° C. or the temperature rising rate is slower than 50° C./sec, it is not possible to sufficiently suppress the growth of $SiO_2$. On the other hand, the atmospheric dew point is preferably as low as possible. Therefore, the lower limit is not particularly set, but a special facility becomes necessary to realize a lower limit of lower than −50° C., which is not industrially preferable. Therefore, the lower limit of the atmospheric dew point may be set to −50° C.

The atmosphere in the first temperature range is not particularly limited, and well-known conditions can be applied.

<Nitriding Treatment Step>

A nitriding treatment may be performed between the decarburization annealing step and the final annealing step to be described below.

In the nitriding treatment step, for example, the cold-rolled steel sheet after the decarburization annealing step is maintained at approximately 700° C. to 850° C. in a nitriding treatment atmosphere (an atmosphere containing a gas having a nitriding ability such as hydrogen, nitrogen, or ammonia). Here, it is preferable to perform the nitriding treatment on the steel sheet so that the N content of the cold-rolled steel sheet becomes 40 to 1000 ppm on a mass basis. When the N content of the cold-rolled steel sheet after the nitriding treatment is less than 40 ppm, AlN is not sufficiently precipitated in the cold-rolled steel sheet, and there is a possibility that AlN may not function as an inhibitor. Therefore, in a case where AlN is utilized as an inhibitor, the N content of the cold-rolled steel sheet after the nitriding treatment is preferably set to 40 ppm or more.

On the other hand, in a case where the N content of the cold-rolled steel sheet exceeds 1000 ppm, AlN is excessively present in the steel sheet even after the completion of secondary recrystallization in the final annealing. Such AlN causes iron loss deterioration. Therefore, the N content of the cold-rolled steel sheet after the nitriding treatment is preferably set to 1000 ppm or less.

<Final Annealing Step>

In the final annealing step, a predetermined annealing separating agent is applied to one surface or both surfaces of the cold-rolled steel sheet obtained in the decarburization annealing step or further subjected to the nitriding treatment, and then final annealing is performed. The final annealing is ordinarily performed for a long time in a state where the steel sheet has been coiled in a coil shape. Therefore, prior to the final annealing, an annealing separating agent is applied to the cold-rolled steel sheet and dried for the purpose of preventing seizure between the inside and outside of the coil.

As the annealing separating agent to be applied, an annealing separating agent containing MgO as a main component (for example, containing 80% or more of MgO by weight fraction) is used. The use of the annealing separating agent containing MgO as a main component makes it possible to form a glass coating on the surface of the base steel sheet. In a case where MgO is not a main component, no primary coating (glass coating) is formed. This is because the primary coating is a $Mg_2SiO_4$ or $MgAl_2O_4$ compound and Mg necessary for the formation reaction is deficient.

The final annealing may be performed under conditions that, for example, in an atmospheric gas containing hydrogen and nitrogen, the temperature is raised up to 1150° C. to 1250° C. and then the cold-rolled steel sheet is annealed in that temperature range for 10 to 60 hours.

<Coating-Forming Step>

In the coating-forming step, a tension-applied insulation coating is formed on one surface or both surfaces of the cold-rolled steel sheet after final annealing. The conditions for forming the tension-applied insulation coating are not particularly limited, and a treatment liquid may be applied and dried by a well-known method using a well-known insulation coating treatment liquid. When the tension-applied insulation coating is formed on the surface of the steel sheet, it becomes possible to further improve the magnetic characteristics of the grain-oriented electrical steel sheet.

The surface of the steel sheet on which the insulation coating (tension-applied insulation coating) is to be formed may be a surface on which an optional pretreatment such as a degreasing treatment with an alkali or the like or a pickling treatment with hydrochloric acid, sulfuric acid, phosphoric acid, or the like has been performed before the application of the treatment liquid or may be a surface as final-annealed on which no pretreatments are performed.

The insulation coating that is formed on the surface of the steel sheet is not particularly limited as long as the insulation coating can be used as an insulation coating of grain-oriented electrical steel sheets, and it is possible to use a well-known insulation coating. As such an insulation coating, coatings containing phosphate and colloidal silica as main components are exemplary examples. In addition, composite insulation coatings containing an inorganic substance as a main component and further containing an organic substance are exemplary examples. Here, the composite insulation coating is an insulation coating containing at least any inorganic substance such as a metal chromium acid salt, a metal phosphate salt, colloidal silica, a Zr compound, or a Ti compound as a main component, in which fine particles of an organic resin are dispersed. Particularly, from the viewpoint of reducing the environmental load during manufacturing, which has been highly requested in recent years, there are cases where an insulation coating for which a metal phosphate, a Zr or Ti coupling agent, or a carbonate or ammonium salt thereof is used as a starting material is used.

<Magnetic Domain Segmentation Step>

In the magnetic domain segmentation step, the surface of the tension-applied insulation coating is irradiated with an energy ray such as a laser beam or an electron beam, thereby introducing a plurality of linear strains that extend in a direction at an angle $\phi$ of 60° to 120° with respect to the rolling direction near the surface of the base steel sheet (from the surface through the inside of the steel sheet). In the magnetic domain segmentation step, the plurality of linear strains (thermal strains generated by rapid heating by energy ray irradiation and subsequent rapid cooling) are formed at predetermined intervals in the rolling direction, and the intervals (that is, the intervals (p) of adjacent strains) are set to 3.0 to 9.0 mm in the rolling direction.

When the intervals p of the plurality of linear strains in the rolling direction are more than 9.0 mm, the iron loss improvement effect is insufficient.

As the energy ray, a laser beam and an electron beam are exemplary examples. The laser beam may be a continuous wave laser or a pulsed laser. Examples of the kind of the laser beam include a fiber laser, a YAG laser, or a $CO_2$ laser. The electron beam may be a continuous beam or an intermittent beam.

In addition, as described above, in order to obtain a grain-oriented electrical steel sheet satisfying both a low iron loss and low noise, in the magnetic domain segmentation step, the tension insulation coating is irradiated with the energy ray, thereby introducing strains in the base steel sheet and forming closure domains shallow below the front surface.

Specifically, the tension-applied insulation coating is irradiated with the laser beam so that a laser power density Ip that is defined by P/S using a laser output P in a unit of W and a laser irradiation cross-sectional area S in a unit of $mm^2$ satisfies the following expression (3) and a laser input energy Up in a unit of J/mm that is defined by (P/Vs) using the laser output P and a laser scanning velocity Vs in a unit of mm/sec satisfies the following expression (4).

$$250 \le Ip \le 2000 \quad \text{Expression (3)}$$

$$0.005 < Up \le 0.050 \quad \text{Expression (4)}$$

When Ip is less than 250, sufficient energy is not input, and the magnetic domain segmentation effect (iron loss improvement effect) cannot be obtained. Therefore, Ip is 250 or more. Ip is preferably 500 or more.

On the other hand, when Ip becomes more than 2000, excess thermal strains are introduced beyond the magnetic domain segmentation effect, whereby the noise characteristics deteriorate. Therefore, Ip is 2000 or less. Ip is preferably 1750 or less and more preferably 1500 or less.

In addition, when Up is 0.005 or less, the irradiation effect cannot be sufficiently obtained, and the iron loss does not sufficiently improve. Therefore, Up is more than 0.005. On the other hand, when Up is more than 0.050, the noise characteristics deteriorate. Therefore, Up is 0.050 or less.

Here, the laser beam has been described as a specific example, but the description is also true even in a case where other energy ray means such as an electron beam is used.

Furthermore, in the method for manufacturing a grain-oriented electrical steel sheet according to the present embodiment, upon the irradiation with the energy ray, the beam aspect ratio is controlled so as to satisfy the following expression (5), the beam aspect ratio being defined by (dl/dc) using a diameter dl in a direction perpendicular to a beam scanning direction (scanning direction) and a diameter dc in the beam scanning direction of the energy ray in a unit of μm.

$$0.001<dl/dc<1.000 \quad (5)$$

When the beam aspect ratio is 0.001 or less, heat is released during the beam irradiation, the input efficiency of the input energy decreases, and a sufficient magnetic domain segmentation effect (iron loss improvement effect) cannot be obtained. Therefore, the beam aspect ratio is more than 0.001.

On the other hand, in a case where the beam aspect ratio is 1.000 or more, heat is not released during the beam irradiation; however, instead, residual stress is generated, and a low noise effect cannot be obtained. Therefore, the beam aspect ratio is less than 1.000. The beam aspect ratio is preferably less than 0.050 and more preferably less than 0.005.

In addition, the diameter dl of the energy ray in the direction perpendicular to the beam scanning direction in a unit of μm is made to satisfy the following expression (6).

$$10\leq dl<200 \quad (6)$$

It is industrially difficult to produce beams having dl of less than 10. Therefore, dl is 10 or more.

On the other hand, when dl becomes 200 or more, excess thermal strains are introduced beyond the magnetic domain segmentation effect, whereby the noise characteristics deteriorate. Therefore, dl is less than 200. dl is preferably less than 150 and more preferably less than 100.

In the method for manufacturing a grain-oriented electrical steel sheet according to the present embodiment, as described above, irradiation is performed with an energy ray having a relatively strong Ip in a state where the beam aspect ratio is small. Such irradiation is normally not performed. This is because it is considered that a decrease in the beam aspect ratio leads to dispersion of irradiation energy and weakens the effect of increasing Ip.

However, the present inventors found for the first time that the above-described irradiation conditions are preferable as a result of studies based on a new finding that the spatial distribution control of strains is important from the viewpoint of reducing the iron loss and noise at the same time.

EXAMPLES

Steel pieces were prepared from steel numbers (A to G) each having a different chemical composition as shown in Table 1.

Next, a grain-oriented electrical steel sheets (Test Nos. 1 to 28) were manufactured using each steel piece.

Specifically, the steels B, E, and F were heated to temperatures within a range of 1100° C. to 1200° C., and then the steels were hot-rolled, whereby hot-rolled steel sheets having a sheet thickness of 2.3±0.3 mm were produced. In addition, the steel pieces A, C, D, and G were heated to temperatures within a range of 1300° C. to 1400° C., and then the steel pieces were hot-rolled, whereby hot-rolled steel sheets having a sheet thickness of 2.3±0.3 mm were produced.

Next, hot-rolled sheet annealing was performed on the obtained hot-rolled steel sheets. Specifically, the hot-rolled steel sheets were annealed under conditions of an annealing temperature of 1000° C. to 1200° C. and a retention time of 10 to 200 seconds.

Next, surface scale was removed from the hot-rolled steel sheets after hot rolled sheet annealing by performing pickling or the like, and then cold rolling is performed once or twice with annealing therebetween to produce cold-rolled steel sheets in which the sheet thickness of a base metal was 0.19 to 0.23 mm.

Decarburization annealing was performed on the obtained cold-rolled steel sheets under conditions shown in Table 2. In addition, in a soaking step of decarburization annealing, the cold-rolled steel sheets were soaked at a temperature of 800° C. to 840° C. for 100 to 150 seconds. The degree of oxidation ($PH_2O/PH_2$) at that time was controlled to 0.3 to 0.5. On Test Nos. 2, 5, 6, 9, 10, 14, 16, 18, 23, 26, and 27 for which steels B, E, and F were used, a nitriding treatment was further performed.

Next, a final annealing step was performed on the cold-rolled steel sheets. Specifically, an annealing separating agent containing magnesium oxide (MgO) as a main component (80% or more by weight fraction) was applied to the surfaces of the cold-rolled steel sheets.

Next, the cold-rolled steel sheets to which the annealing separating agent had been applied were annealed at 1000° C. to 1300° C., and steel sheets having a glass coating on a base steel sheet were produced.

Next, a coating-forming step was performed on these steel sheets. Specifically, an insulation coating-forming liquid containing colloidal silica and phosphate as main components was applied to the surfaces of the steel sheets (more specifically, the surfaces of the glass coatings, which are primary coatings) and heat-treated (baked). Therefore, grain-oriented electrical steel sheets including the base steel sheet, the glass coating formed on the base steel sheet, and a tension-applied insulation coating formed on the glass coating were obtained.

TABLE 1

| | Slab (mass %, remainder: Fe and impurities) | | | | | | | | | | | | | |
|---|---|---|---|---|---|---|---|---|---|---|---|---|---|---|
| Steel | C | Si | Mn | N | Sol. Al | P | S | Sn | Cu | Bi | Cr | Se | Sb | Mo |
| A | 0.085 | 3.45 | 0.08 | 0.010 | 0.026 | 0.010 | 0.022 | 0.15 | — | — | — | — | — | — |
| B | 0.061 | 3.50 | 0.25 | 0.010 | 0.029 | — | 0.010 | — | 0.20 | — | — | — | — | — |
| C | 0.055 | 3.20 | 0.40 | 0.020 | 0.020 | 0.030 | 0.020 | — | — | 0.005 | 0.06 | — | — | — |
| D | 0.077 | 3.45 | 0.09 | 0.008 | 0.020 | 0.010 | 0.020 | — | — | — | — | 0.010 | 0.005 | 0.01 |
| E | 0.035 | 3.25 | 0.32 | 0.020 | 0.040 | — | 0.028 | — | — | — | — | — | — | — |
| F | 0.055 | 3.40 | 0.10 | 0.010 | 0.033 | 0.020 | 0.010 | — | — | — | — | — | — | — |
| G | 0.082 | 3.35 | 0.08 | 0.008 | 0.024 | 0.010 | 0.024 | — | — | — | — | — | — | — |

TABLE 2

| | Material (base steel sheet) | | Decarburization annealing step | | |
|---|---|---|---|---|---|
| | | | Temperature rising rate 550° C. | Temperature rising rate 750° C. | Atmospheric dew point 750° C. |
| Test No. | Steel | Thickness mm | to 750° C. ° C./sec | to 800° C. ° C./sec | to 800° C. ° C. |
| 1 | A | 0.22 | 700 | 1000 | −20 |
| 2 | B | 0.22 | 500 | 800 | 30 |
| 3 | C | 0.23 | 700 | 800 | 30 |
| 4 | D | 0.23 | 700 | 1000 | 40 |
| 5 | E | 0.23 | 1000 | 1200 | 30 |
| 6 | F | 0.23 | 1300 | 1200 | 0 |
| 7 | G | 0.22 | 1000 | 1200 | −10 |
| 8 | D | 0.20 | 500 | 50 | −30 |
| 9 | E | 0.20 | 500 | 50 | −30 |
| 10 | F | 0.19 | 500 | 50 | −20 |
| 11 | A | 0.19 | 700 | 50 | −20 |
| 12 | G | 0.22 | 900 | 100 | 0 |
| 13 | D | 0.22 | 400 | 50 | 0 |
| 14 | F | 0.22 | 600 | 50 | 25 |
| 15 | A | 0.22 | 600 | 800 | 30 |
| 16 | B | 0.22 | 600 | 800 | 30 |
| 17 | A | 0.23 | 600 | 100 | 0 |
| 18 | B | 0.23 | 600 | 100 | 0 |
| 19 | C | 0.23 | 700 | 1000 | 0 |
| 20 | D | 0.23 | 700 | 1000 | 0 |
| 21 | D | 0.22 | 700 | 50 | 0 |
| 22 | A | 0.22 | 700 | 1000 | 0 |
| 23 | B | 0.22 | 500 | 800 | 0 |
| 24 | C | 0.23 | 700 | 800 | −10 |
| 25 | D | 0.23 | 700 | 1000 | −10 |
| 26 | E | 0.23 | 1000 | 1200 | −20 |
| 27 | F | 0.23 | 1300 | 1200 | −20 |
| 28 | G | 0.22 | 1000 | 1200 | −20 |

[Analysis of Chemical Composition of Base Steel Sheet]

The chemical composition of the base steel sheet of the grain-oriented electrical steel sheet with each test number before magnetic domain segmentation obtained by the above-described method was obtained by the following method.

First, the tension-applied insulation coating was removed from the grain-oriented electrical steel sheet with each test number. Specifically, the grain-oriented electrical steel sheet was immersed in a sodium hydroxide aqueous solution (80° C. to 90° C.) containing NaOH: 30 to 50 mass % and $H_2O$: 50 to 70 mass % for 7 to 10 minutes. The grain-oriented electrical steel sheet after the immersion (the grain-oriented electrical steel sheet from which the tension-applied insulation coating had been removed) was washed with water. After the water washing, the grain-oriented electrical steel sheet was dried with a warm air blower for little less than 1 minute.

Next, the glass coating was removed from the grain-oriented electrical steel sheet including no tension-applied insulation coating. Specifically, the grain-oriented electrical steel sheet was immersed in a hydrochloric acid aqueous solution (80° C. to 90° C.) containing 30 to 40 mass % of HCL for 1 to 10 minutes. Thereby, the glass coating was removed from the base steel sheet. The base steel sheet after the immersion was washed with water. After the water washing, the grain-oriented electrical steel sheet was dried with a warm air blower for little less than 1 minute. The base steel sheet was taken out from the grain-oriented electrical steel sheet by the above-described step.

The chemical composition of the taken-out base steel sheet was obtained by a well-known component analysis method. Specifically, chips were generated from the base steel sheet using a drill, and the chips are collected. The collected chips were dissolved in an acid to obtain a solution. ICP-AES was performed on the solution to perform an elemental analysis of the chemical composition. Si in the chemical composition of the base steel sheet was obtained by a method specified in JIS G 1212 (1997) (Methods for Determination of Silicon Content). Specifically, when the above-described chips were dissolved in an acid, silicon oxide was precipitated as a precipitate. This precipitate (silicon oxide) was filtered out with filter paper, and the mass was measured, thereby obtaining the Si content. The C content and the S content were obtained by a well-known high-frequency combustion method (combustion-infrared absorption method). Specifically, the above-described solution was combusted by high-frequency heating in an oxygen stream, carbon dioxide and sulfur dioxide generated were detected, and the C content and the S content were obtained. The N content was obtained using a well-known inert gas melting-thermal conductivity method. The chemical composition of the base steel sheet was obtained by the above-described analysis method. The results are shown in Table 3.

TABLE 3

| | | Base steel sheet (mass %, remainder: Fe and impurities) | | | | | | | | | | | | |
|---|---|---|---|---|---|---|---|---|---|---|---|---|---|---|
| Test No. | Steel | C | Si | Mn | N | Sol. Al | P | S | Sn | Cu | Cr | Se | Sb | Mo |
| 1 | A | 0.001 | 3.28 | 0.06 | 0.002 | 0.001 | 0.010 | 0.001 | 0.15 | — | — | — | — | — |
| 2 | B | 0.002 | 3.35 | 0.20 | 0.002 | 0.002 | — | 0.001 | — | 0.20 | — | — | — | — |
| 3 | C | 0.002 | 3.11 | 0.40 | 0.001 | 0.001 | 0.030 | 0.001 | — | — | 0.06 | — | — | — |
| 4 | D | 0.002 | 3.30 | 0.08 | 0.002 | 0.001 | 0.010 | 0.001 | — | — | — | 0.005 | 0.005 | 0.01 |
| 5 | E | 0.001 | 3.18 | 0.30 | 0.001 | 0.001 | — | 0.001 | — | — | — | — | — | — |
| 6 | F | 0.002 | 3.29 | 0.10 | 0.001 | 0.002 | 0.020 | 0.001 | — | — | — | — | — | — |
| 7 | G | 0.002 | 3.20 | 0.07 | 0.001 | 0.001 | 0.010 | 0.001 | — | — | — | — | — | — |
| 8 | D | 0.002 | 3.40 | 0.09 | 0.002 | 0.001 | 0.010 | 0.001 | — | — | — | 0.008 | 0.005 | 0.01 |
| 9 | E | 0.002 | 3.10 | 0.29 | 0.003 | 0.001 | — | 0.001 | — | — | — | — | — | — |
| 10 | F | 0.002 | 3.31 | 0.08 | 0.004 | 0.001 | 0.020 | 0.001 | — | — | — | — | — | — |
| 11 | A | 0.001 | 3.26 | 0.07 | 0.002 | 0.002 | 0.010 | 0.001 | 0.14 | — | — | — | — | — |
| 12 | G | 0.002 | 3.20 | 0.06 | 0:001 | 0.001 | 0.010 | 0.001 | — | — | — | — | — | — |
| 13 | D | 0.001 | 3.38 | 0.09 | 0.001 | 0.001 | 0.010 | 0.001 | — | — | — | 0.007 | 0.004 | 0.01 |
| 14 | F | 0.011 | 3.29 | 0.08 | 0.001 | 0.002 | 0.015 | 0.001 | — | — | — | — | — | — |
| 15 | A | 0.002 | 3.25 | 0.07 | 0.002 | 0.002 | 0.009 | 0.001 | 0.15 | — | — | — | — | — |
| 16 | B | 0.001 | 3.33 | 0.19 | 0.001 | 0.001 | — | 0.001 | — | 0.20 | — | — | — | — |
| 17 | A | 0.001 | 3.29 | 0.07 | 0.004 | 0.001 | 0.010 | 0.001 | 0.13 | — | — | — | — | — |
| 18 | B | 0.002 | 3.37 | 0.18 | 0.002 | 0.001 | — | 0.001 | — | 0.18 | — | — | — | — |
| 19 | C | 0.002 | 3.09 | 0.37 | 0.003 | 0.001 | 0.030 | 0.001 | — | — | 0.06 | — | — | — |
| 20 | D | 0.002 | 3.23 | 0.07 | 0.001 | 0.001 | 0.010 | 0.001 | — | — | — | 0.008 | 0.005 | 0.01 |
| 21 | D | 0.001 | 3.33 | 0.07 | 0.001 | 0.001 | 0.009 | 0.001 | — | — | — | 0.006 | 0.004 | 0.01 |

TABLE 3-continued

| | | Base steel sheet (mass %, remainder: Fe and impurities) | | | | | | | | | | | | |
|---|---|---|---|---|---|---|---|---|---|---|---|---|---|---|
| Test No. | Steel | C | Si | Mn | N | Sol. Al | P | S | Sn | Cu | Cr | Se | Sb | Mo |
| 22 | A | 0.001 | 3.28 | 0.06 | 0.002 | 0.001 | 0.010 | 0.001 | 0.15 | — | — | — | — | — |
| 23 | B | 0.002 | 3.33 | 0.19 | 0.002 | 0.001 | — | 0.001 | — | 0.20 | — | — | — | — |
| 24 | C | 0.002 | 3.09 | 0.38 | 0.001 | 0.001 | 0.020 | 0.001 | — | — | 0.06 | — | — | — |
| 25 | D | 0.002 | 3.29 | 0.08 | 0.001 | 0.001 | 0.010 | 0.001 | — | — | — | 0.005 | 0.005 | 0.01 |
| 26 | E | 0.001 | 3.18 | 0.29 | 0.001 | 0.001 | — | 0.001 | — | — | — | — | — | — |
| 27 | F | 0.002 | 3.38 | 0.10 | 0.001 | 0.002 | 0.020 | 0.001 | — | — | — | — | — | — |
| 28 | G | 0.002 | 3.19 | 0.05 | 0.001 | 0.001 | 0.010 | 0.001 | — | — | — | — | — | — |

Although not shown in the table, in order to evaluate the iron loss improvement ratio, for the grate-oriented electrical steel sheet with each test number, the iron loss before magnetic domain segmentation wind. A sample having width of 60 mm and a length of 300 mm including opt width center position was collected from the grain-oriented electrical steel sheet with each test number. The length direction of the sample was set to be parallel to the rolling direction. The collected sample was retained at 800° C. for 2 hours in a nitrogen atmosphere having a dew point of 0° C. or lower, and strains introduced at the time of sample collection were removed.

The iron loss $W_{17/50}$ (W/kg) at a frequency set to 50 Hz and a maximum magnetic flux density set to 1.7 T was measured using this sample.

After that, magnetic domain segmentation was performed on the grain-oriented electrical steel sheet with each test number by irradiating the surface of the grain-oriented electrical steel sheet with an energy ray under conditions shown in Table 4 and Table 5 using a continuous wave laser or an intermittent wave laser. Evaluation tests of the noise characteristics and the magnetic characteristics were performed on the grain-oriented electrical steel sheet after the magnetic domain segmentation.

[Evaluation of Noise Characteristics]

From a sample having a width of 60 mm and a length of 300 mm on which the magnetic domain control had been performed, magnetostriction was measured by an AC magnetostriction measuring method using a magnetostriction measuring instrument. As the magnetostriction measuring instrument, an apparatus including a laser Doppler vibrometer, an exciting coil, an exciting power supply, a magnetic flux detecting coil, an amplifier, and an oscilloscope was used.

Specifically, an AC magnetic field was applied to the sample so that the maximum magnetic flux density became 1.7 T in the rolling direction. A change in the length of the sample caused by the expansion and contraction of the magnetic domains was measured with the laser Doppler vibrometer, and a magnetostriction signal was obtained. Fourier analysis was performed on the obtained magnetostriction signal to obtain an amplitude Cn of each frequency component fn (n is a natural number of 1 or more) of the magnetostriction signal. A magnetostriction rate level LVA (dB) represented by the following expression was obtained using an A correction coefficient an of each frequency component fn.

$$LVA=20\times\mathrm{Log}(\sqrt{}(\Sigma(\rho c\times 2\pi\times fn\times\alpha n\times Cn/\sqrt{}2)^2)/Pe0)$$

Here, ρc is an intrinsic acoustic resistance, and pc was set to 400. Pe0 was the minimum audible sound pressure, and $Pe0=2\times10^5$ (Pa) was used. As the A correction coefficient αn, values shown in Table 2 of JIS C 1509-1 (2005) were used.

Based on the obtained magnetostriction rate level (LVA), the noise characteristics were evaluated according to the following criteria. When the magnetostriction rate level was less than 60 dBA, the grain-oriented electrical steel sheet was determined to be "excellent in terms of noise characteristics". When the magnetostriction rate level was less than 50 dBA, the grain-oriented electrical steel sheet was determined to be particularly excellent. When the magnetostriction rate level was 60 dBA or more, the grain-oriented electrical steel sheet was determined to be "insufficient in terms of noise characteristics".

The results are shown in Table 5.

[Evaluation of Magnetic Characteristics]

In order to evaluate the iron loss improvement effect by the magnetic domain control as the magnetic characteristics, the iron loss improvement ratio was evaluated.

The iron loss $W_{17/50}$ (W/kg) at a frequency set to 50 Hz and a maximum magnetic flux density set to 1.7 T was measured using a sample having a width of 60 mm and a length of 300 mm on which the magnetic domain control had been performed.

In addition, the iron loss improvement ratio (%) was calculated from [(iron loss before magnetic domain control−iron loss after magnetic domain control)×100]/iron loss before magnetic domain control and obtained using an iron loss $W_{17/50}$ (W/kg) measured here and an iron loss $W_{17/50}$ (W/kg) measured before the magnetic domain control.

When the iron loss improvement ratio was 5% or more, it was determined that "there was an iron loss improvement effect", and, when the iron loss improvement ratio was 10% or more, it was determined that "there was a significant iron loss improvement effect".

However, for materials having an iron loss after the magnetic domain control of more than 0.85 W/kg, it was determined that "the magnetic characteristics were insufficient" regardless of the improvement ratio of the magnetic domain control.

In addition, accordingly, the magnetic flux density (T) was obtained by a single sheet magnetic characteristics test (SST test) using this sample. Specifically, a magnetic field of 800 A/m was applied to the sample, and the magnetic flux density (T) was obtained.

The results are shown in Table 5.

In the present evaluations, only cases where "there was an iron loss improvement effect" regarding the magnetic characteristics and "the grain-oriented electrical steel sheet was excellent in terms of noise characteristics" regarding the noise characteristics, the grain-oriented electrical steel sheets were determined as acceptable, that is, invention examples. Cases where it was determined that "there noise characteristics were insufficient" or "the magnetic characteristics were insufficient" regarding at least any one of the magnetic characteristics and the noise characteristics, the grain-oriented electrical steel sheets were determined as "comparative examples".

TABLE 4

| Test No. | Magnetic domain segmentation step: Kind of energy ray | Continuous/ intermittent | Irradiation front surface/front surface and rear surface | Ip $W/mm^2$ | Up J/mm | dl/dc — | dl μm |
|---|---|---|---|---|---|---|---|
| 1 | Laser | Continuous | Only front surface | 1989 | 0.010 | 0.075 | 60 |
| 2 | Laser | Continuous | Only front surface | 331 | 0.010 | 0.039 | 150 |
| 3 | Laser | Continuous | Only front surface | 331 | 0.008 | 0.039 | 150 |
| 4 | Laser | Continuous | Only front surface | 331 | 0.008 | 0.039 | 150 |
| 5 | Laser | Continuous | Only front surface | 1102 | 0.014 | 0.039 | 150 |
| 6 | Laser | Continuous | Only front surface | 1654 | 0.014 | 0.026 | 100 |
| 7 | Laser | Continuous | Only front surface | 1654 | 0.010 | 0.026 | 100 |
| 8 | Laser | Continuous | Only front surface | 1102 | 0.008 | 0.016 | 60 |
| 9 | Laser | Continuous | Only front surface | 1102 | 0.008 | 0.016 | 60 |
| 10 | Laser | Continuous | Front surface and rear surface | 1102 | 0.008 | 0.016 | 60 |
| 11 | Laser | Continuous | Only front surface | 1984 | 0.016 | 0.008 | 30 |
| 12 | Laser | Intermittent | Only front surface | 1984 | 0.010 | 0.008 | 30 |
| 13 | Laser | Continuous | Only front surface | 1323 | 0.018 | 0.013 | 50 |
| 14 | Laser | Continuous | Only front surface | 1323 | 0.012 | 0.013 | 50 |
| 15 | Laser | Continuous | Only front surface | 1323 | 0.024 | 0.013 | 50 |
| 16 | Laser | Continuous | Only front surface | 1323 | 0.005 | 0.013 | 50 |
| 17 | Laser | Continuous | Only front surface | 220 | 0.010 | 0.019 | 75 |
| 18 | Laser | Continuous | Only front surface | 6614 | 0.010 | 0.019 | 75 |
| 19 | Laser | Continuous | Only front surface | 661 | 0.056 | 0.026 | 100 |
| 20 | Laser | Continuous | Only front surface | 661 | 0.001 | 0.026 | 100 |
| 21 | Laser | Continuous | Only front surface | 661 | 0.010 | 0.026 | 100 |
| 22 | Laser | Continuous | Only front surface | 1886 | 0.012 | 1.200 | 180 |
| 23 | Laser | Continuous | Only front surface | 265 | 0.012 | 0.065 | 250 |
| 24 | Laser | Continuous | Only front surface | 700 | 0.013 | 0.003 | 100 |
| 25 | Laser | Continuous | Only front surface | 1075 | 0.013 | 0.016 | 60 |
| 26 | Laser | Continuous | Only front surface | 796 | 0.013 | 0.002 | 60 |
| 27 | Laser | Continuous | Only front surface | 1929 | 0.015 | 0.016 | 60 |
| 28 | Laser | Continuous | Only front surface | 1929 | 0.042 | 0.016 | 60 |

TABLE 5

| Test No. | Strain: Extension direction (angle with respect to rolling direction) ° | Strain: Interval mm | Strain: Width μm | X-ray diffraction intensity of (310) plane: Full width at half maximum of XRT peak mm | X-ray diffraction intensity of (310) plane: $\|J_0 - J_{min}\|/\|I_0 - I_{min}\|$ — | Magnetic characteristics: Iron loss before magnetic domain control W/kg | Magnetic characteristics: Iron loss after magnetic domain control W/kg | Magnetic characteristics: Magnetic flux density T | Magnetic characteristics: Iron loss improvement ratio % | Noise characteristics dB | Note |
|---|---|---|---|---|---|---|---|---|---|---|---|
| 1 | 85 | 5.0 | 65 | 0.02 | 1.14 | 0.82 | 0.75 | 1.95 | 9% | 52 | Invention Example |
| 2 | 87 | 5.0 | 150 | 0.02 | 1.36 | 0.81 | 0.74 | 1.94 | 9% | 51 | Invention Example |
| 3 | 88 | 4.0 | 153 | 0.07 | 1.20 | 0.83 | 0.76 | 1.95 | 8% | 52 | Invention Example |
| 4 | 88 | 4.0 | 153 | 0.07 | 1.20 | 0.82 | 0.74 | 1.94 | 10% | 51 | Invention Example |
| 5 | 88 | 7.0 | 155 | 0.04 | 0.51 | 0.88 | 0.78 | 1.92 | 11% | 47 | Invention Example |
| 6 | 88 | 7.0 | 102 | 0.06 | 0.45 | 0.87 | 0.77 | 1.91 | 11% | 48 | Invention Example |
| 7 | 88 | 5.0 | 103 | 0.06 | 0.35 | 0.85 | 0.76 | 1.93 | 11% | 47 | Invention Example |
| 8 | 87 | 4.0 | 63 | 0.05 | 0.28 | 0.79 | 0.70 | 1.94 | 11% | 46 | Invention Example |
| 9 | 87 | 4.0 | 62 | 0.04 | 0.59 | 0.78 | 0.69 | 1.94 | 12% | 47 | Invention Example |
| 10 | 87 | 4.0 | 61 | 0.04 | 0.43 | 0.79 | 0.69 | 1.95 | 13% | 46 | Invention Example |
| 11 | 83 | 8.0 | 50 | 0.06 | 0.44 | 0.78 | 0.67 | 1.92 | 14% | 45 | Invention Example |
| 12 | 86 | 5.0 | 50 | 0.04 | 0.38 | 0.82 | 0.75 | 1.92 | 9% | 51 | Invention Example |
| 13 | 87 | 9.0 | 50 | 0.12 | 0.01 | 0.80 | 0.75 | 1.94 | 6% | 62 | Comparative Example |
| 14 | 88 | 6.0 | 60 | 0.99 | 0.01 | 0.92 | 0.89 | 1.95 | 3% | 59 | Comparative Example |

TABLE 5-continued

| | Strain | | | X-ray diffraction intensity of (310) plane | | Magnetic characteristics | | | | | |
|---|---|---|---|---|---|---|---|---|---|---|---|
| Test No. | Extension direction (angle with respect to rolling direction) ° | Interval mm | Width μm | Full width at half maximum of XRT peak mm | $\|J_0 - J_{min}\|/\|I_0 - I_{min}\|$ — | Iron loss before magnetic domain control W/kg | Iron loss after magnetic domain control W/kg | Magnetic flux density T | Iron loss improvement ratio % | Noise characteristics dB | Note |
| 15 | 85 | 12.0 | 60 | 0.02 | 1.25 | 0.85 | 0.82 | 1.93 | 4% | 55 | Comparative Example |
| 16 | 89 | 2.0 | 60 | 0.02 | 1.20 | 0.86 | 0.78 | 1.92 | 9% | 65 | Comparative Example |
| 17 | 82 | 5.0 | 80 | 0.15 | 1.54 | 0.81 | 0.79 | 1.94 | 2% | 55 | Comparative Example |
| 18 | 90 | 5.0 | 80 | 0.01 | 2.52 | 0.83 | 0.73 | 1.93 | 12% | 60 | Comparative Example |
| 19 | 79 | 4.0 | 105 | 0.25 | 1.60 | 0.82 | 0.73 | 1.96 | 11% | 64 | Comparative Example |
| 20 | 90 | 4.0 | 105 | 0.01 | 1.56 | 0.82 | 0.79 | 1.95 | 4% | 57 | Comparative Example |
| 21 | 88 | 5.0 | 103 | 0.07 | 0.95 | 0.83 | 0.73 | 1.93 | 12% | 47 | Invention Example |
| 22 | 79 | 6.0 | 183 | 0.01 | 1.02 | 0.88 | 0.77 | 1.93 | 13% | 64 | Comparative Example |
| 23 | 88 | 6.0 | 253 | 0.04 | 1.05 | 0.87 | 0.77 | 1.92 | 11% | 63 | Comparative Example |
| 24 | 89 | 5.0 | 105 | 0.03 | 0.25 | 0.83 | 0.72 | 1.92 | 13% | 47 | Invention Example |
| 25 | 87 | 6.0 | 63 | 0.03 | 0.38 | 0.83 | 0.73 | 1.92 | 12% | 48 | Invention Example |
| 26 | 89 | 5.0 | 62 | 0.04 | 0.35 | 0.79 | 0.69 | 1.93 | 13% | 47 | Invention Example |
| 27 | 88 | 6.0 | 61 | 0.05 | 0.27 | 0.82 | 0.72 | 1.94 | 12% | 47 | Invention Example |
| 28 | 85 | 6.0 | 60 | 0.03 | 0.32 | 0.81 | 0.71 | 1.94 | 12% | 46 | Invention Example |

As is clear from Tables 1 to 5, Test Nos. 1 to 12, 21, and 24 to 28, which are invention examples, are excellent in terms of magnetic characteristics and noise characteristics. That is, "the iron loss improvement ratio was 5% or more", "the iron loss after magnetic domain control was 0.85 W/kg or less", and "the magnetostriction rate level was less than 60 dBA".

In Test Nos. 5 to 11 and Test No. 21, the iron loss improvement ratio exceeded 10%, then, the magnetostriction rate level was less than 50 dBA, and the characteristics were particularly favorable. This is because Ip and Up, which are the laser irradiation conditions, were within the more preferable control ranges.

In Test Nos. 1 to 4 and Test No. 12, both Ip and Up, which are the laser irradiation conditions, were outside the preferable or more preferable ranges, but were within ranges that satisfied the ranges of the present invention, and thus it was possible to acquire the effect of the invention.

In contrast, Test Nos. 13 to 20, 22, and 23 are comparative examples and were poor in terms of at least one of the magnetic characteristics and the noise characteristics.

Test No. 13 was outside the scope of the present invention in the temperature rising step of the decarburization annealing. That is, in Test No. 13, the orientation sharpness of Goss grains was not sufficient in the secondary recrystallization structure. Therefore, although strains were introduced under conditions within the scope of the present invention, the full width at half maximum of the X-ray topographic spectrum was outside the scope of the present invention, and the noise characteristics were poor.

In Test No. 14, decarburization was not sufficient. Therefore, the iron loss exceeded 0.85 W/kg even after the magnetic domain control, and the iron loss improvement ratio was also low.

In Test No. 15, the intervals of the linear strains exceeded 9.0 mm. As a result, the strain introduction intervals were wide, and thus the frequency of presence of secondary recrystallized grains that were not magnetic-domain-controlled increased. Consequently, the magnetic domain control effect was insufficient, and the iron loss improvement ratio did not reach 5%.

In Test No. 16, the intervals of the linear strains were less than 3.0 mm. Strains were excessively introduced, whereby the noise characteristics were poor.

In Test Nos. 17 to 20, the strain application conditions were outside the scope of the present invention.

In Test No. 17. Ip was small, and, in Test No. 20, Up was small, and thus it was not possible to obtain the magnetic domain segmentation effect, the full widths at half maximum of the X-ray topographic spectra were outside the range of the present invention, and the iron loss improvement ratio s did not reach 5%.

In Test No. 18, Ip was large, and, in Test No. 19, Up was large, and thus the full widths at half maximum of the X-ray topographic spectra were outside the range of the present invention, and the noise characteristics were poor.

In Test No. 22, the beam aspect ratio exceeded 1.000, and thus the full widths at half maximum of the X-ray topographic spectra were outside the range of the present invention, and it was not possible to obtain a desired low noise effect.

In Test No. 23, since the diameter dl in the direction perpendicular to the beam scanning direction was 200 μm or more, the widths of the strains became large, excessive thermal strains were introduced, and it was not possible to obtain a desired low noise effect.

INDUSTRIAL APPLICABILITY

According to the present invention, it is possible to provide a grain-oriented electrical steel sheet having excellent iron loss characteristics and noise characteristics and a method for manufacturing the same, and the industrial applicability is high.

What is claimed is:

1. A grain-oriented electrical steel sheet comprising:

a base steel sheet;

a glass coating formed on the base steel sheet; and a tension-applied insulation coating formed on the glass coating, wherein the base steel sheet has the chemical composition, by mass %:

C: 0.010% or less,

Si: 3.00% to 4.00%,

Mn: 0.01% to 0.50%,

N: 0.010% or less,

Sol. Al: 0.020% or less,

P: 0.030% or less,

S: 0.010% or less,

Sn: 0% to 0.50%,

Cu: 0% to 0.50%,

Cr: 0% to 0.50%,

Se: 0% to 0.020%,

Sb: 0% to 0.500%,

Mo: 0% to 0.10%, and a remainder of Fe and impurities, wherein, on a front surface of the base steel sheet, a plurality of linear strains that extend continuously or intermittently in a direction intersecting with a rolling direction are present, intervals p in the rolling direction of the plurality of linear strains adjacent to each other are 3.0 to 9.0 mm, widths of the linear strains are 10 to 250 μm, and in an X-ray topographic spectrum in a range of 1.50 mm in the rolling direction including the linear strain at a center, that is obtained from an X-ray topographic image of the front surface, a full width at half maximum of a peak of the X-ray topographic spectrum including a maximum value of a spectral intensity is 0.02 mm or more and 0.10 mm or less.

2. The grain-oriented electrical steel sheet according to claim 1, wherein, when a range of 3.0 mm in the rolling direction on the front surface that includes the linear strain at a center is irradiated with an X-ray beam, a minimum value of an X-ray reflection intensity of a (310) plane is denoted by $I_{min}$, a background intensity is denoted by $I_0$, and when a range of 3.0 mm in the rolling direction on a rear surface that includes the linear strain at a center is irradiated with an X-ray beam, a minimum value of an X-ray reflection intensity of an obtained diffraction plane (310) plane is represented by $J_{min}$, and a background intensity is represented by $J_0$, the $I_{min}$, the $I_0$, the $J_{min}$, and the $J_0$ satisfy the following expression (2), $$0.02 \leq |J_0 - J_{min}|/|I_0 - I_{min}| \leq 1.00 \quad (2).$$

3. The grain-oriented electrical steel sheet according to claim 1, wherein the chemical composition of the base steel sheet contains either or both of Sn: 0.01% to 0.50% and Cu: 0.05% to 0.50%.

4. The grain-oriented electrical steel sheet according to claim 2, wherein the chemical composition of the base steel sheet contains either or both of Sn: 0.01% to 0.50% and Cu: 0.05% to 0.50%.

5. A method for manufacturing the grain-oriented electrical steel sheet according to claim 1, the method comprising:

a hot rolling step of heating and then hot-rolling a steel piece having the chemical composition, by mass %, C: 0.010% to 0.200%, Si: 3.00% to 4.00%, Mn: 0.01% to 0.50%, N: 0.020% or less, Sol. Al: 0.010% to 0.040%, P: 0.030% or less, S: 0.005% to 0.040%, Sn: 0% to 0.50%, Cu: 0% to 0.50%, Bi: 0% to 0.020%, Cr: 0% to 0.50%, Se: 0% to 0.020%, Sb: 0% to 0.500%, Mo: 0% to 0.10%, and a remainder of Fe and impurities to obtain a hot-rolled steel sheet;

a hot-rolled sheet annealing step of performing hot-rolled sheet annealing on the hot-rolled steel sheet;

a cold rolling step of performing cold rolling once or a plurality of times with process annealing therebetween on the hot-rolled steel sheet after the hot-rolled sheet annealing step to obtain a cold-rolled steel sheet;

a decarburization annealing step of performing decarburization annealing on the cold-rolled steel sheet;

a final annealing step of applying and drying an annealing separating agent containing MgO as a main component on front and rear surfaces of the cold-rolled steel sheet after the decarburization annealing step that is a base steel sheet and performing final annealing to form a glass coating;

a coating-forming step of forming a tension-applied insulation coating on the glass coating to obtain a grain-oriented electrical steel sheet including the base steel sheet, the glass coating formed on the base steel sheet, and the tension-applied insulation coating formed on the glass coating; and a magnetic domain segmentation step of irradiating a front surface of the tension-applied insulation coating of the grain-oriented electrical steel sheet with an energy ray to apply a plurality of linear strains to the base steel sheet, wherein, in the magnetic domain segmentation step, among the plurality of linear strains, intervals in a rolling direction of linear strains adjacent to each other are 3.0 to 9.0 mm, an energy ray power density Ip in a unit of W/mm$^2$ that is defined by (P/S) using an energy ray output P in a unit of W and an energy ray irradiation cross-sectional area S in a unit of mm$^2$ satisfies the following expression (3), an energy ray input energy Up in a unit of J/mm that is defined by (P/Vs) using the energy ray output P and an energy ray scanning velocity Vs in a unit of mm/sec satisfies the following expression (4), a beam aspect ratio that is defined by (dl/dc) using a diameter dl in a direction perpendicular to a beam scanning direction and a diameter dc in the beam scanning direction of the energy ray in a unit of μm and the dl each satisfy the following expression (5) and the following expression (6), and in the decarburization annealing step, a temperature rising rate S1 in a first temperature range of 550° C. to 750° C. is set to 500° C./sec or faster, and a temperature rising rate S2 in a second temperature range of 750° C. to 800° C. is set to 800° C./sec or faster or a temperature rising rate S2 in the second temperature range is set to 50° C./sec or faster, and an atmospheric dew point in the second temperature range is set to −50° C. to 20° C., $$250 \leq Ip \leq 2000 \quad (3)$$

$$0.005 < Up \leq 0.050 \quad (4)$$

$$0.001 < dl/dc < 1.000 \quad (5)$$

$$10 \leq dl < 200 \quad (6).$$

6. The method for manufacturing the grain-oriented electrical steel sheet according to claim 5, the method further comprising:

a nitriding treatment step of performing a nitriding treatment on the cold-rolled steel sheet between the decarburization annealing step and the final annealing step.

7. The method for manufacturing the grain-oriented electrical steel sheet according to claim 5, wherein the chemical composition of the steel piece contains either or both of Sn: 0.01% to 0.50% and Cu: 0.05% to 0.50%.

8. The method for manufacturing the grain-oriented electrical steel sheet according to claim 6, wherein the chemical composition of the steel piece contains either or both of Sn: 0.01% to 0.50% and Cu: 0.05% to 0.50%.

* * * * *